US006424342B1

United States Patent
Perlman et al.

(10) Patent No.: US 6,424,342 B1
(45) Date of Patent: *Jul. 23, 2002

(54) DECOMPRESSING AND COMPOSITING GRAPHICAL IMAGE DATA

(75) Inventors: Stephen G. Perlman; Beth Clough, both of Mountain View, CA (US)

(73) Assignee: Webtv Networks, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,181

(22) Filed: Sep. 16, 1998

(51) Int. Cl.[7] .............................................. G06F 17/00
(52) U.S. Cl. ...................................... 345/418; 382/232
(58) Field of Search ................................. 345/418, 202, 345/555; 382/232, 233, 253; 348/393, 405, 437

(56) References Cited

U.S. PATENT DOCUMENTS

| | | | | |
|---|---|---|---|---|
| 5,574,836 A | * | 11/1996 | Broemmelsiek | 395/127 |
| 5,706,418 A | * | 1/1998 | Uchiyama | 395/130 |
| 5,946,419 A | * | 8/1999 | Chen et al. | 382/243 |
| 5,983,247 A | * | 11/1999 | Yamanaka et al. | 707/526 |
| 6,018,749 A | * | 1/2000 | Rivette et al. | 707/525 |

OTHER PUBLICATIONS

Baxes, Digital Image Processing, Principles and Applications, 1994, pp. 179, 208, 209.*
Sikora, The MPEG–4 Video Standard Verifciation Model, Feb. 1997, pp. 19–31.*

* cited by examiner

*Primary Examiner*—Mark Zimmerman
*Assistant Examiner*—Lance W. Sealey
(74) *Attorney, Agent, or Firm*—Workman, Nydegger, Seeley

(57) ABSTRACT

Systems and methods for mapping, decompressing, and compositing graphical image in preparation for displaying an image on a display screen. Graphical image data is received by a graphics engine, which maps portions of the data to pixel positions on the display screen. If the data is compressed, it is decompressed after being mapped to pixel locations. The data is then composited in a scanline buffer, which stored display parameters that specify the colors and other properties of pixel in a single scanline on the display screen. Mapping the data prior to decompression reduces the random access memory resources otherwise required. In particular, the entire volume of compressed graphical image data received by the graphics engine does not need to be decompressed and stored in a random access memory device before being mapped to pixels on the display screen. In addition, the scanline buffers allow an entire frame on the display screen to be refreshed while storing, at any one instant, composited data corresponding to no more than two scanlines.

30 Claims, 17 Drawing Sheets

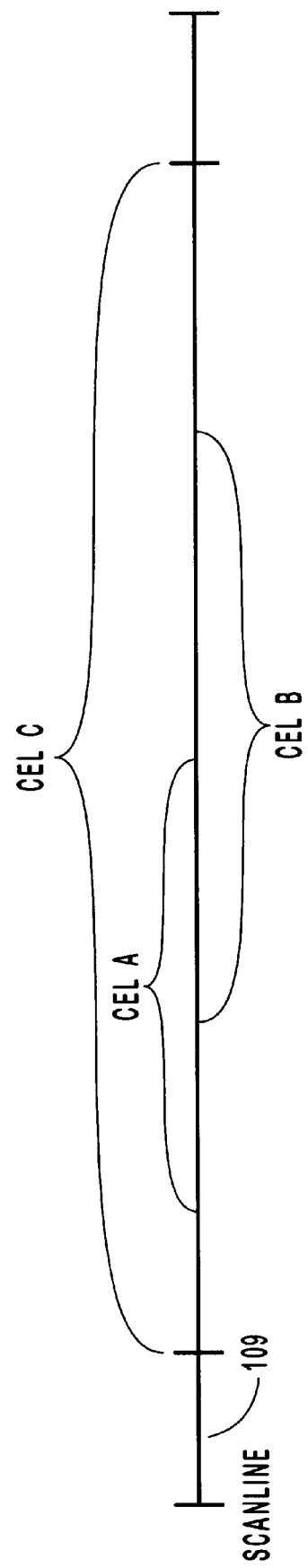

DECOMPRESSING AND COMPOSITING GRAPHICAL IMAGE DATA

BACKGROUND OF THE INVENTION

1. The Field of the Invention

The present invention relates to systems and methods for processing graphical image data in preparation for displaying a graphical image on a display screen. In particular, the present invention relates to systems and methods for sequentially mapping graphical image data to pixel positions on the display screen, decompressing the graphical image data, and compositing the graphical image data one scanline at a time as the graphical image is refreshed.

2. The Prior State of the Art

As computer use has become increasingly common, many techniques for displaying information on computer display screens have been developed. One of the reasons that computer use is widespread is the ability to display large amounts of information on display screens. For example, much of the recent dramatic growth of the Internet, particularly the World Wide Web ("Web"), has been caused by the ability to rapidly transmit and display graphical images and information.

Many conventional methods for displaying graphical image data involve one or more of the following techniques: decompressing compressed data, mapping image data to pixel locations, and compositing multiple images. These techniques are discussed in reference to FIG. 1, which illustrates a conventional system 10 capable of decompressing, mapping, and compositing graphical image data in preparation for generating an image on a display screen. System 10 may be embodied, for example, in a general purpose or special purpose computer.

System 10 receives compressed image data 12 from a source such as a remote server or a local computer-readable medium. Data compression decreases the amount of computer memory required to store graphical image data, and reduces the bandwidth and the transmission time needed to send the graphical image data between computers. However, there is a tradeoff for the efficiency gains provided by data compression. In particular, decompression of compressed data consumes computing resources and many data compression techniques result in some loss of image quality.

The compressed image data 12 is processed by a decompression module 14 according to any known decompression algorithm. The resulting decompressed image data 16 is then processed by a mapping module 18, whereby the image data is associated with specific pixels on display screen 22. Mapping image data to pixel locations involves selecting the position, orientation, etc., of the image data on the display screen. The processing capabilities of computers allow graphical image data to be manipulated, moved, scaled, warped, and otherwise processed in order to display information to the user in interesting and useful ways. For example, many Web pages, computer games, and other computer applications generate images that incorporate moving images or other image manipulation. In its most simple manifestation, mapping of image data to pixel locations simply involves directly associating data points in a two-dimensional graphical image data array to the corresponding pixel locations on the display screen.

In the example of FIG. 1, decompressed image data 16 may include pixel display parameters that define the luminance, chrominance, translucence, or other characteristics of pixels that will be selected on the display screen. Thus, mapping module 18 specifies the pixels on the display screen that are to be lighted according to the pixel display parameters encoded in decompressed image data 16.

Once decompressed image data 16 is mapped to pixel locations on display screen 22, the data is written to a frame buffer 20, which contains the information needed to refresh the entire frame on display screen 22. Once the image data is assembled at frame buffer 20, it is transmitted to display screen 22 to refresh the previous image displayed thereon.

The process of writing the data to frame buffer 20 may include compositing the data with other image data that has previously been written to frame buffer 20. Compositing multiple images is a technique whereby several graphical images are assembled to form a larger image, such as a full frame image on a display screen. For example, the display generated by a Web page may consist of several component images that are arranged on the display screen. Some of the images might appear to be in the foreground, with others in the background. Foreground images may cover portions of background images to produce the perception of depth. In addition, each image can be assigned a translucence value, such that background images can be partially seen through the foreground images.

While the system of FIG. 1 can be used to display graphical images on display screens, it is subject to several limitations. First, decompression module 14 decompresses the entire volume of compressed image data 12 and stores the resulting decompressed image data 16 in a random access memory device. The entire volume of decompressed image data 16 requires significant memory resources, which must have access times fast enough to keep pace with the refresh rate of display screen 22. Depending on the mapping procedures executed by mapping module 18, some of the decompressed image data 16 may never appear on display screen 22, but is nonetheless decompressed and stored in the random access memory device. Second, frame buffer 20 receives and temporarily stores the entire volume of image data needed to refresh a full frame at display screen 22. The storage of this data also requires significant memory resources, which also must have access times fast enough to keep pace with the refresh rate of display screen 22. If the expense of the memory and bandwidth resources needed to support decompression, mapping, and compositing of graphical image data could be reduced, the availability and complexity of graphical imaging could be increased.

In view of the foregoing, there is a need in the art for systems and methods that do not require decompression and storage of the full volume of compressed image data prior to the steps of mapping and compositing the data in preparation for refreshing an image on a display screen. It would also be advantageous to provide systems and methods for compositing the image data that have reduced memory requirements compared to the conventional frame buffer systems that store enough data to refresh an entire frame of a display screen. It would be advantageous if such systems and methods could be compatible with compression and decompression techniques that allow image data to be accessed while requiring relatively small data transmission bandwidth or memory resources.

SUMMARY AND OBJECTS OF THE INVENTION

The present invention relates to systems and methods for mapping, decompressing, and compositing graphical image data using less random access memory and bandwidth resources than have been possible according to conventional techniques. Unlike prior techniques, the invention does not require the entire volume of compressed graphical image data received by the graphics engine to be decompressed and stored in a random access memory device before being mapped to pixels on the display screen. Furthermore, the systems of the invention include scanline buffers for storing composited data used to refresh a single scanline on the display screen, in contrast to full frame buffers of conventional systems, which store enough composited image data to refresh an entire frame on the display screen.

As compressed graphical image data is provided to the graphics engine of the invention, the compressed data is first mapped to pixel locations of the display screen and then decompressed. Conducting the step of mapping the graphical image data before conducting the decompression step provides the advantage of eliminating the need to store decompressed image data in a random access memory device before the data is mapped to pixel locations. In addition, conducting the mapping step first can allow some of the compressed graphical image data to remain compressed. For example, if, according to the mapping step, a portion of the compressed graphical image data is not to be displayed on the display screen, that portion does not undergo decompression. This feature of the invention significantly reduces the amount of decompression otherwise required in many circumstances.

After the graphical image data is decompressed, the data can be composited in scanline buffers on a scanline-by-scanline basis. The scanline buffers, which contain data corresponding to only one scanline at a time, stand in contrast to the conventional full frame buffers, and reduce the system memory resources needed to conduct graphical imaging.

In view of the foregoing, the invention provides methods of mapping, decompressing, and compositing graphical image data using less random access memory and bandwidth resources than has been previously possible. As a result, the cost of graphical imaging systems that operate according to the invention can be less than the cost of conventional systems.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 8B is a schematic diagram showing a selected scanline on which a portion of the graphical image is to be generated according to the method of FIG. 7.

FIG. 11b illustrates in greater detail the texture map and cel of FIG. 11a.

FIG. 14b is a block diagram illustrating the data being composited to the scanline buffer based on the translucence values calculated in FIG. 14a.

DETAILED DESCRIPTION OF THE PREFERRED EMBODIMENTS

The present invention relates to systems and methods for mapping, decompressing, and compositing graphical image data using less random access memory and bandwidth resources than have been possible according to conventional techniques. Unlike prior techniques, the invention does not require the entire volume of compressed graphical image data received by the graphics engine to be decompressed and stored in a random access memory device before being mapped to pixels on the display screen. Furthermore, the systems of the invention includes scanline buffers for storing composited data used to refresh a single scanline on the display screen, in contrast to full frame buffers of conventional systems, which store enough composited image data to refresh an entire frame on the display screen.

Certain embodiments within the scope of the present invention include computer-readable media having computer-executable instructions or data fields stored thereon. Such computer-readable media can be any available media which can be accessed by a general purpose or special purpose computer. By way of example, and not limitation, such computer-readable media can comprise synchronous graphics random access memory devices ("SGRAM"), other RAM devices, read-only memory ("ROM"), EEPROM, CD-ROM or other optical disk storage, magnetic disk storage or other magnetic storage devices, or any other medium which can be used to store the desired computer-executable instructions or data fields and which can accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Computer-executable instructions and associated data fields represent an example of program code means for executing the steps of the invention disclosed herein. The invention will also be described with reference to graphical image data. The term "graphical image data" extends to any data or data structure that includes information capable of being transformed or processed into an image or a portion of an image on a display screen.

Examples of Computing Environment

Figure 1:
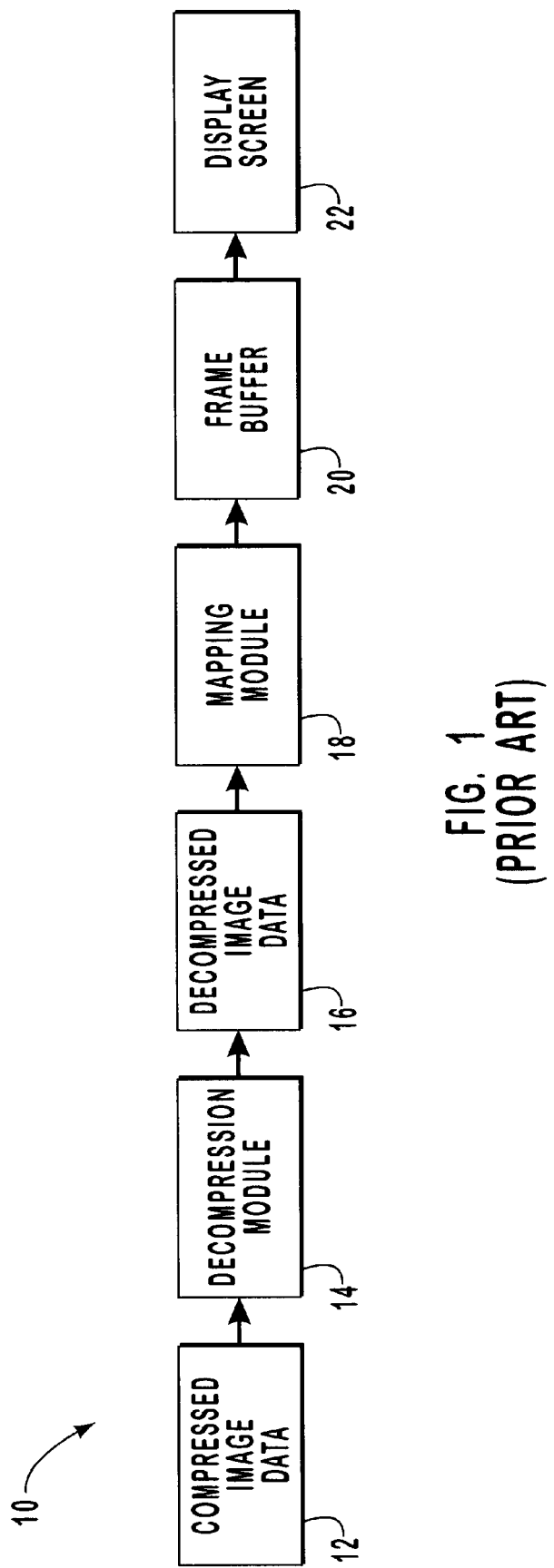
FIG. 1 is a schematic diagram illustrating the flow of graphical image data in conventional systems.
Figure 2:
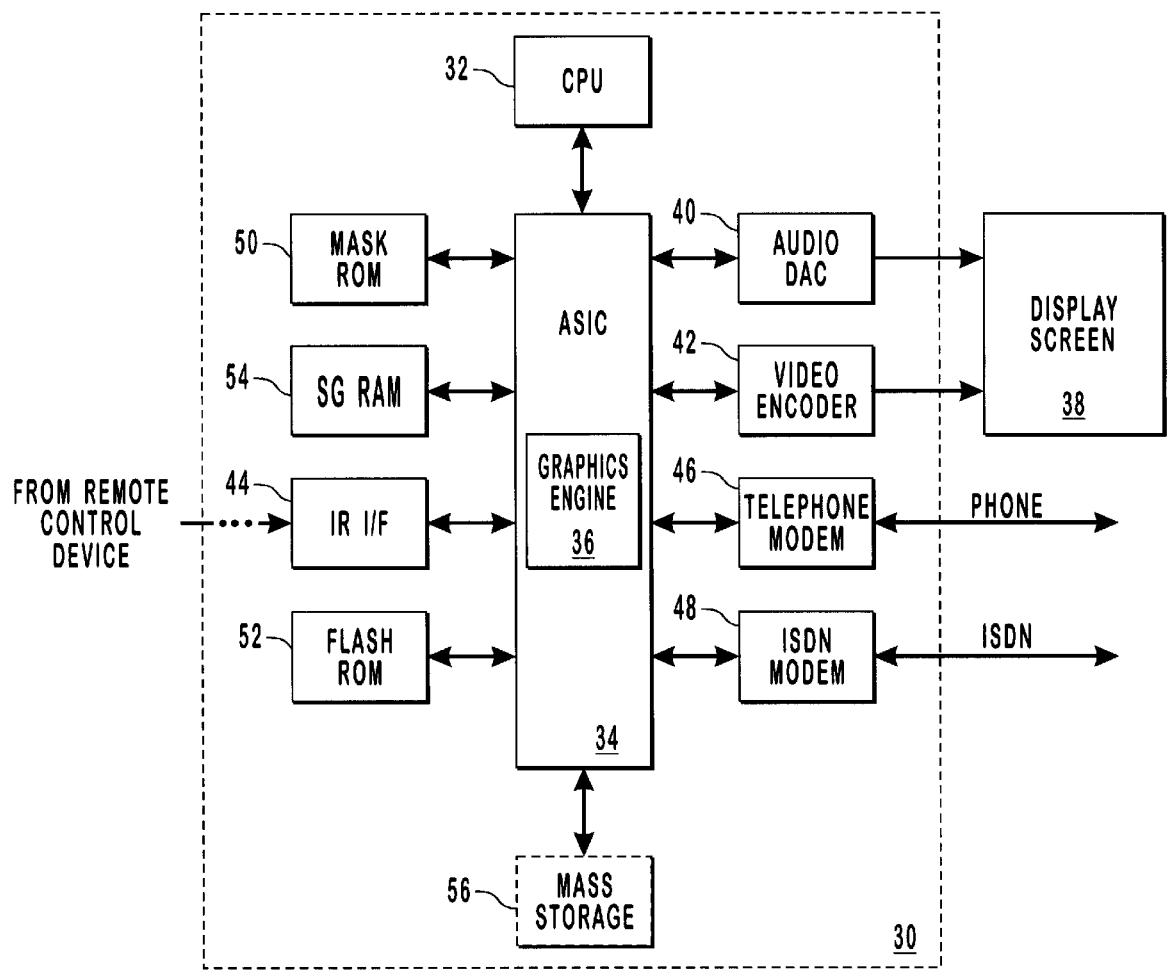
FIG. 2 is a schematic diagram showing a computing environment compatible with the systems and methods of the invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, computer game consoles and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention is illustrated. While FIG. 2 depicts a graphics system 30 that receives graphical image data via the Internet, this example does not limit the sources of graphical image data that can be used with the invention. Those skilled in the art will recognize that graphical image data may be received from a remote data source using any communications infrastructure or from a local computer-readable medium. Alternatively, the graphical image data may be generated by a computer, which may be the same computer that implements other steps of the invention.

Graphics system 30 uses hardware and computer-executable instructions for providing the user with a graphical user interface, by which the user can access Internet resources and, among other things, retrieve and display graphical image data. Operation of graphics system 30 is controlled by a central processing unit (CPU) 32, which is coupled to an application-specific integrated circuit (ASIC) 34. CPU 32 executes computer-executable instructions designed to implement features of graphics system 30.

ASIC 34 contains circuitry which is used to implement certain functions of graphics system 30 and to execute certain steps of the invention. For example, ASIC 34 includes a graphics engine 36, which may receive compressed graphical image data and output composited image data that is to be used to render graphical images on a display screen. As further described herein, graphics engine 36 conducts the steps of mapping the compressed graphical image data to pixel locations on display screen 38, decompressing the data, and compositing the data according to an embodiment of the invention. ASIC 34 may be coupled to an audio digital-to-analog converter 40 and to a video encoder 42, which provide, respectively, audio output and video output signals, including graphical image output, to display screen device 38.

Graphics system 30 may further include an IR interface 44 for detecting infrared signals transmitted by a remote control input device, such as a hand-held device or a wireless keyboard. In response to the infrared signals, IR interface 44 provides corresponding electrical signals to ASIC 34. A standard telephone modem 46 and an ISDN modem 48 are coupled to ASIC 34 to provide connections to a modem pool and, via the Internet, to remote servers that provide graphical image data to the system. While the client system illustrated in FIG. 2 includes both a telephone modem and an ISDN modem, either one of these devices is sufficient to support the communications of the client system. Furthermore, in other embodiments, modems 46 and 48 may be supplemented or replaced with cable modem 40 or another suitable communications device. In other environments, communication may instead be established using a token ring or Ethernet connection.

Also coupled to ASIC 34 are a mask ROM 50, a flash ROM 52, and a synchronized graphics random access memory (SGRAM) 54. Mask ROM 50 is non-programmable and provides storage of computer-executable instructions and data structures. Flash ROM 52 may be a conventional flash memory device that can be programmed and erased electronically. Flash ROM 52 may store Internet browser software as well as data structures. SGRAM 54 can store graphical image data in preparation for delivering the data to graphics engine 36. In one embodiment, a mass storage device 56 coupled to ASIC 34 is included in graphics system 30. Mass storage device 56 may be used to supply computer-executable instructions and data structures to other components of the graphics system or to receive data downloaded over the network. Mass storage device 56 may include any suitable medium for storing computer-executable instructions, such as magnetic disks, optical disks, and the like.

Application software and associated operating system software are stored in flash ROM 52, or instead may be stored in any other suitable memory device, such as mask ROM 50 or mass storage device 56. According to one embodiment of the invention, mask ROM 50, flash ROM 52, or SGRAM 54 supplies computer-executable instructions to graphics engine 36 to execute the steps of mapping, decompressing, and compositing graphical image data that are more specifically disclosed hereafter.

In one embodiment of the invention, graphics system 30 is included in a WebTV set-top box manufactured by WebTV Networks, Inc. of Mountain View, Calif. Alternatively, graphics system 30 may be any of a variety of systems for providing access to the Internet or other information retrieval systems. Furthermore, the elements of graphics system 30 are not limited to those depicted in FIG. 2, and the invention may be practiced with other special-purpose or general-purpose computers.

General Data Processing

Figure 3:
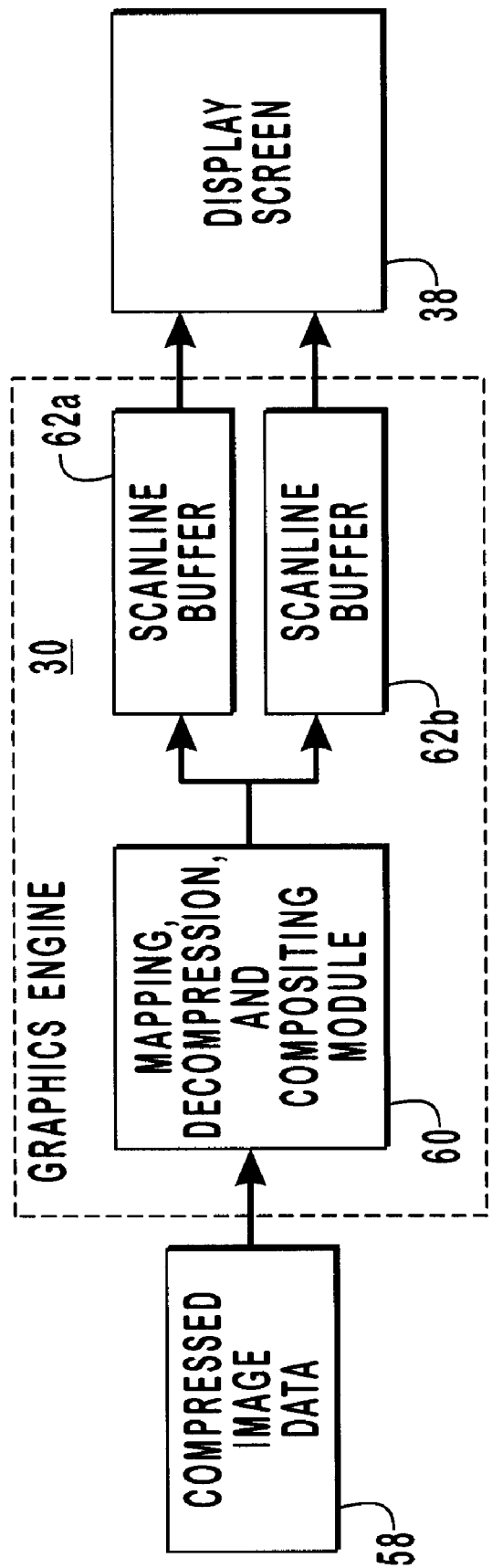
FIG. 3 is a schematic diagram illustrating the flow of graphical image data in a system according to the invention.

FIG. 3 illustrates the data flow in a system capable of mapping, decompressing, and compositing graphical image data according to the invention. Graphics system 30 receives compressed graphical image data 58 from a remote server, a local computer-readable medium, or any other source. The compressed data is processed by a mapping, decompression, and compositing module 60. In one embodiment of the invention, the step of mapping the compressed graphical image data is conducted before the step of decompressing the data, thereby eliminating the need for storing decompressed graphical image data in a RAM device prior to the data being mapped to the display screen. Conducting the mapping step first also reduces, in many cases, the volume of data that would otherwise be decompressed. For example, the mapping procedure may specify that some of the compressed data received by graphics engine 30 will not be displayed on display screen 38. Since the non-displayed data is not associated with pixel locations on the display screen it is not decompressed.

Figure 4:
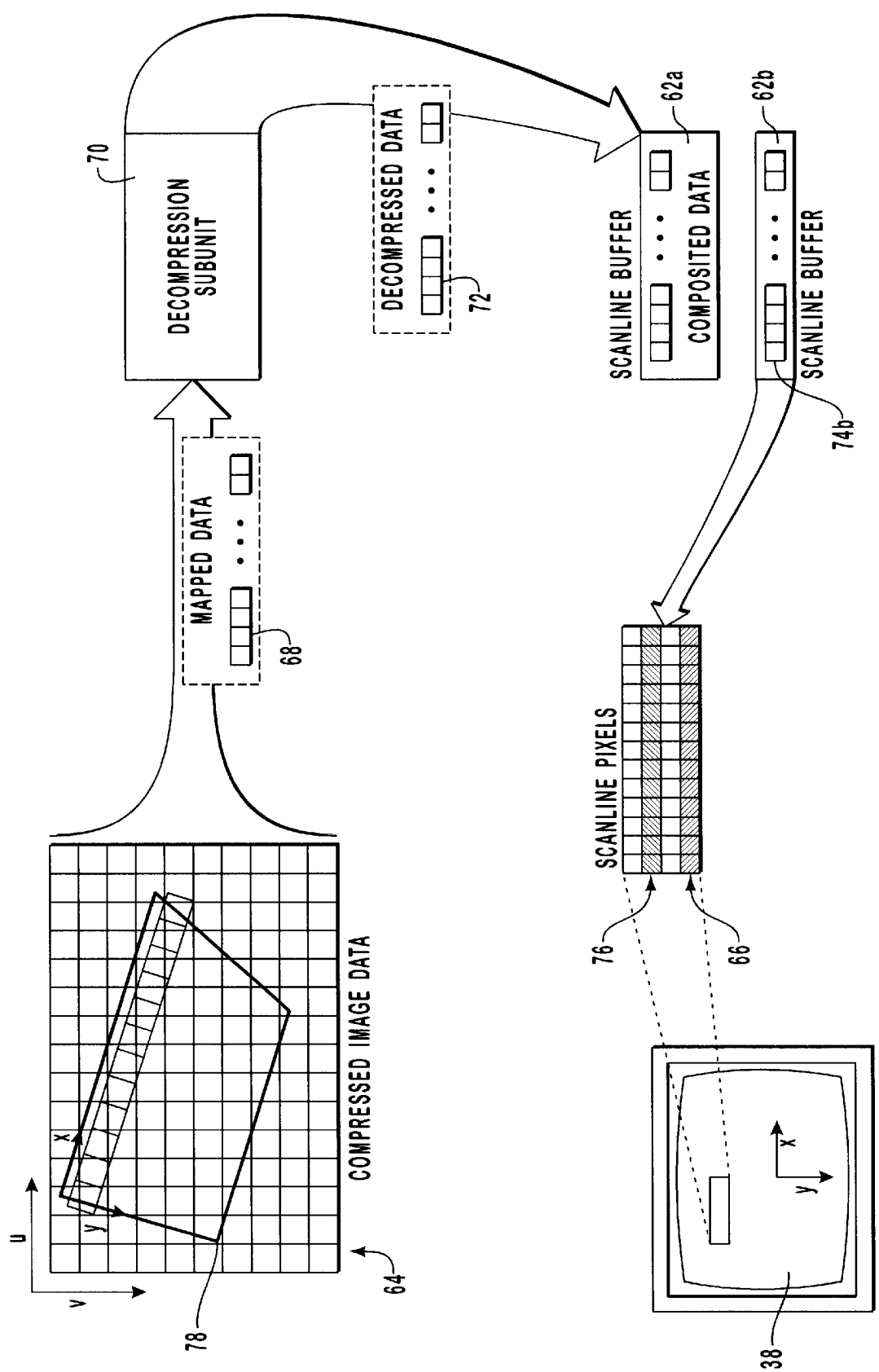
FIG. 4 illustrates graphical image data subjected to mapping, decompression, and compositing steps according to the invention.

Referring to FIG. 4, the flow and processing of graphical image data in a graphics engine according to one embodiment of the invention is further illustrated. As disclosed in greater detail below, compressed graphical image data may be structured in a two-dimensional array 64 corresponding to the manner in which an image is perceived by a viewer. The mapping can involve determining the data entries in data array 64 that correspond to pixel positions included in a scanline, such as scanline 66, of display screen 38.

The mapped data 68, all of which corresponds to a single scanline 66, is passed to a decompression subunit 70. Mapped data 68 is then decompressed according to any appropriate decompression technique. It is noted that, in a preferred embodiment, the graphics engine can also receive and display graphical image data that has not been compressed. The decompressed data 72 transmitted to scanline buffer 62a, where it can be composited with other data corresponding to scanline 66.

The graphics engines of the invention can have two scanlines 62a and 62b that alternatingly function as input buffers and output buffers. As shown in FIG. 4, scanline buffer 62b is currently transmitting signals embodying composited image data 74b to display screen 38, where it is used to refresh scanline 76. While scanline buffer 62b outputs data, scanline buffer 62a receives data and composites the data in preparation for refreshing scanline 66 at the appropriate time. While scanline 66 is being refreshed using composited image data 74a, scanline buffer 62b is again used to receive and composite image data for yet another scanline of display screen 38. The two scanline buffers 62a and 62b continue in this "ping-pong" relationship as all scanlines of display screen 38 are sequentially refreshed, thereby refreshing the entire frame of the display screen.

FIGS. 3 and 4 illustrate several features of this embodiment of the invention that provide substantial reductions in computing, random access memory, and bandwidth resources compared to conventional systems and methods. Since compressed image data is mapped and then decompressed on a scanline basis, decompressed image data is not stored in a random access memory device prior to the mapping step. Furthermore, it can be seen in FIG. 4 that scanline buffers 62a and 62b consume memory resources large enough to store image data for only two scanlines of display screen 38. This is significantly smaller than the frame buffers having memory for an entire frame of display screen 38, which consists of several hundred scanlines.

FIG. 4 also illustrates a way in which this embodiment of the invention can reduce the volume of data that must be decompressed compared to conventional systems. According to this example, the mapping routine specifies that only graphical image data lying within cel boundary 78 is to be displayed on display screen 38. Cel data structures, and cel boundaries are disclosed in greater detail herein. The graphical image data lying outside cel boundary 78 is not to be displayed on the display screen, is not mapped to pixel locations, and is therefore not decompressed. In this example, a significant portion of data array 64 is never subjected to decompression, unlike conventional systems, wherein all compressed data is decompressed in preparation for the subsequent mapping step.

Examples of Graphical Image Data Structures

Figure 5:
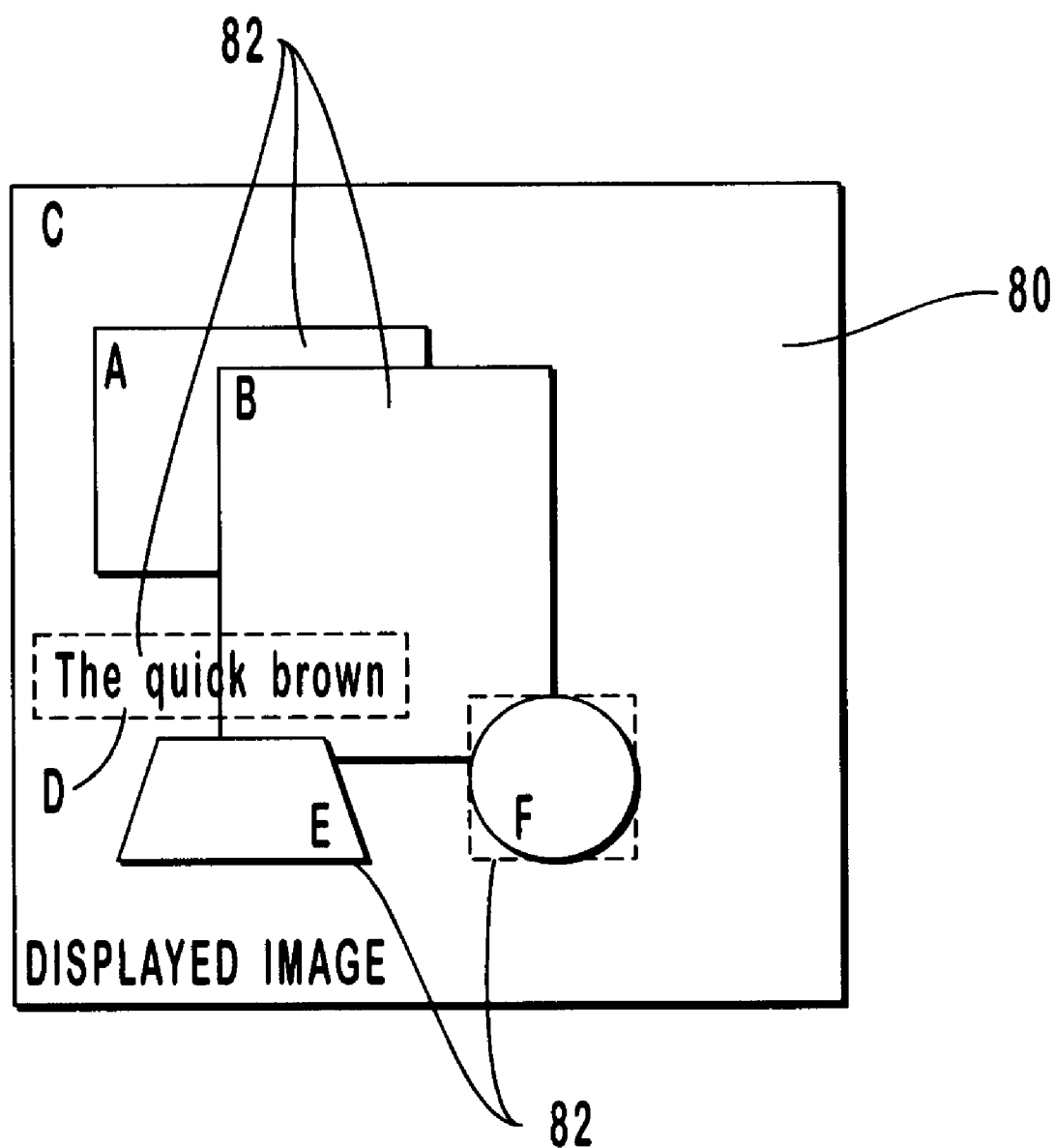
FIG. 5 illustrates an example of a graphical image assembled using cel data structures according to an embodiment of the invention.
Figure 6:
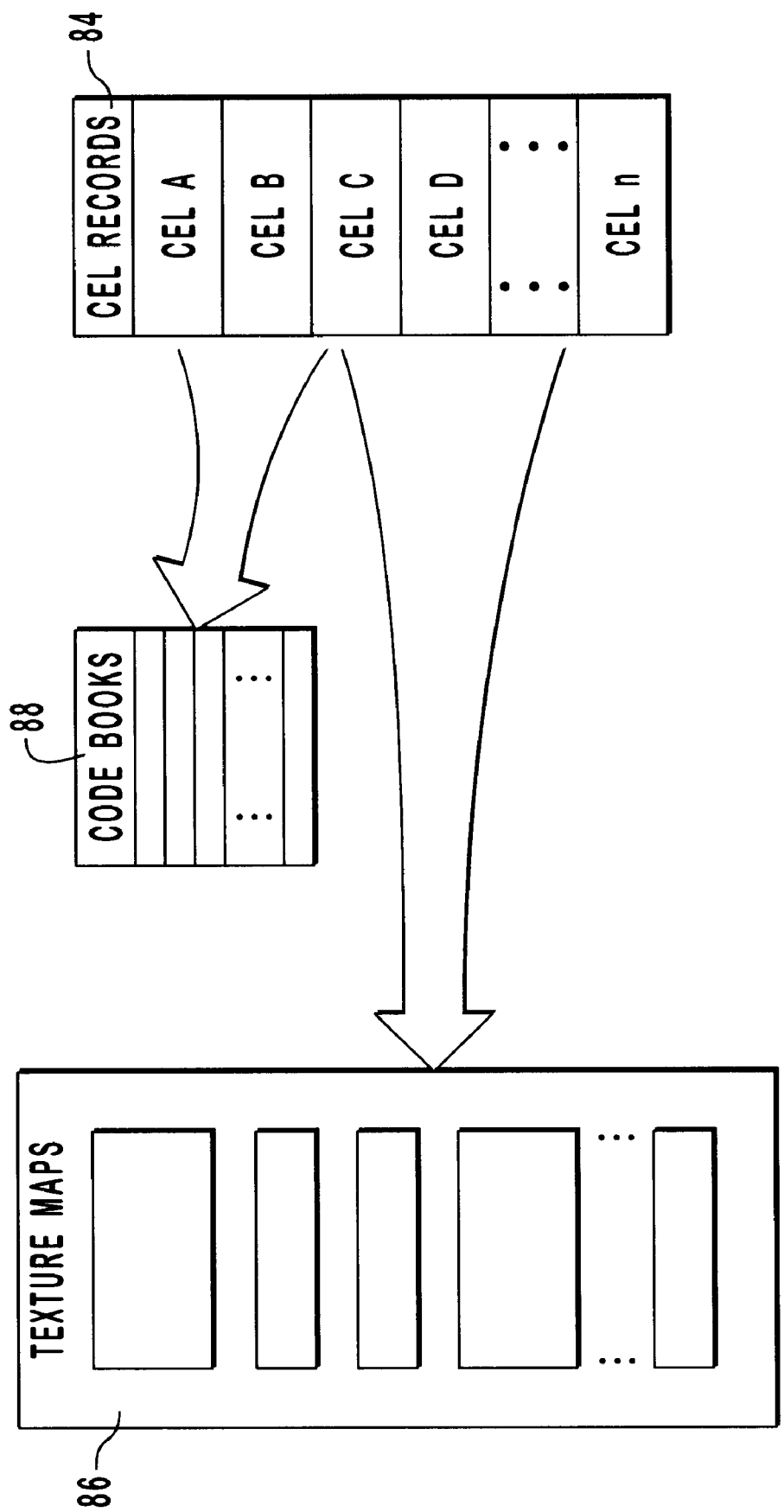
FIG. 6 illustrates data structures used to decompress graphical image data in preparation for rendering a graphical image such as the image depicted in FIG. 5.

Graphical image data structures and the images generated thereby according to certain embodiments of the invention are illustrated in FIGS. 5 and 6. The following examples of graphical image data structures and the structure of displayed images are not to be considered limiting of the scope of the invention. Instead, other compressed image data structures and techniques for assembling an image for display may be used in conjunction with the mapping, decompression, and compositing methods disclosed herein.

FIG. 5 illustrates a displayed image 80 that may be generated on display screen 38 of FIG. 3. In this example, displayed image 80 is composed of a plurality of cels 82, which are component images assembled to form displayed image 80. Cels 82 function in much the same way as animation cels used to produce animated motion pictures. Conceptually, cels 82 are positioned on the display screen relative to one another with some lying in the foreground and some in the background. As perceived by a viewer, some cels may lie on top of other cels. Moreover, cels may optionally have a selected degree of translucence such that background cels may be seen through foreground cels.

Each cel 82 defines the region of the display screen on which an associated component image is to be displayed. Multiple component images positioned on the display screen using cels constitute the displayed image 80. For example, the images displayed in the cels may include text, pictures, graphical patterns, etc. Individual cels may be moved across the display screen, scaled, or warped to generate the appearance of motion, perspective, depth, or other desired effects. The use of cels such as those illustrated in FIG. 5 enables graphical images to be conveniently assembled in a wide variety of computer applications, such as the Internet and computer games.

FIG. 6 illustrates an example of a system for defining cels and identifying the images to be displayed in the cels. The position, size, and other properties of each cel are defined in a corresponding cel record 84. Cel record 84 specifies, for example, coordinates of the pixels on the display screen on which the image associated with the cel is to be displayed. The images associated with the cels are encoded in texture maps 86, which are compressed or non-compressed graphical image data structures. Each texture map 86 contains graphical image data that can be used to generate text, pictures, graphical patterns, etc, and constitutes a subset of the compressed graphical image data processed by the graphical engines of the invention. Data array 64 of FIG. 4 is an example of a texture map.

If texture maps 86 are compressed, cel records 84 may specify the decompression key or algorithm by which the texture maps are to be decompressed. In the example of FIG. 6, texture maps 86 are compressed according to vector quantization. Accordingly, cel records 84 specify which of the code books 88 are to be used to decompress, or decode, the encoded image data in texture maps 86.

According to vector quantization, compressed data of texture maps 86 comprises vectors, which may be four or eight-bit codes associated with pixel colors listed in the associated code book 88. In order to decompress texture maps 86, the systems of this embodiment of the invention read the encoded vectors and identify the associated pixel colors listed in code book 88.

Specific Embodiments

1. Method of Mappings Decompression, and Compositing Data

Figure 7:
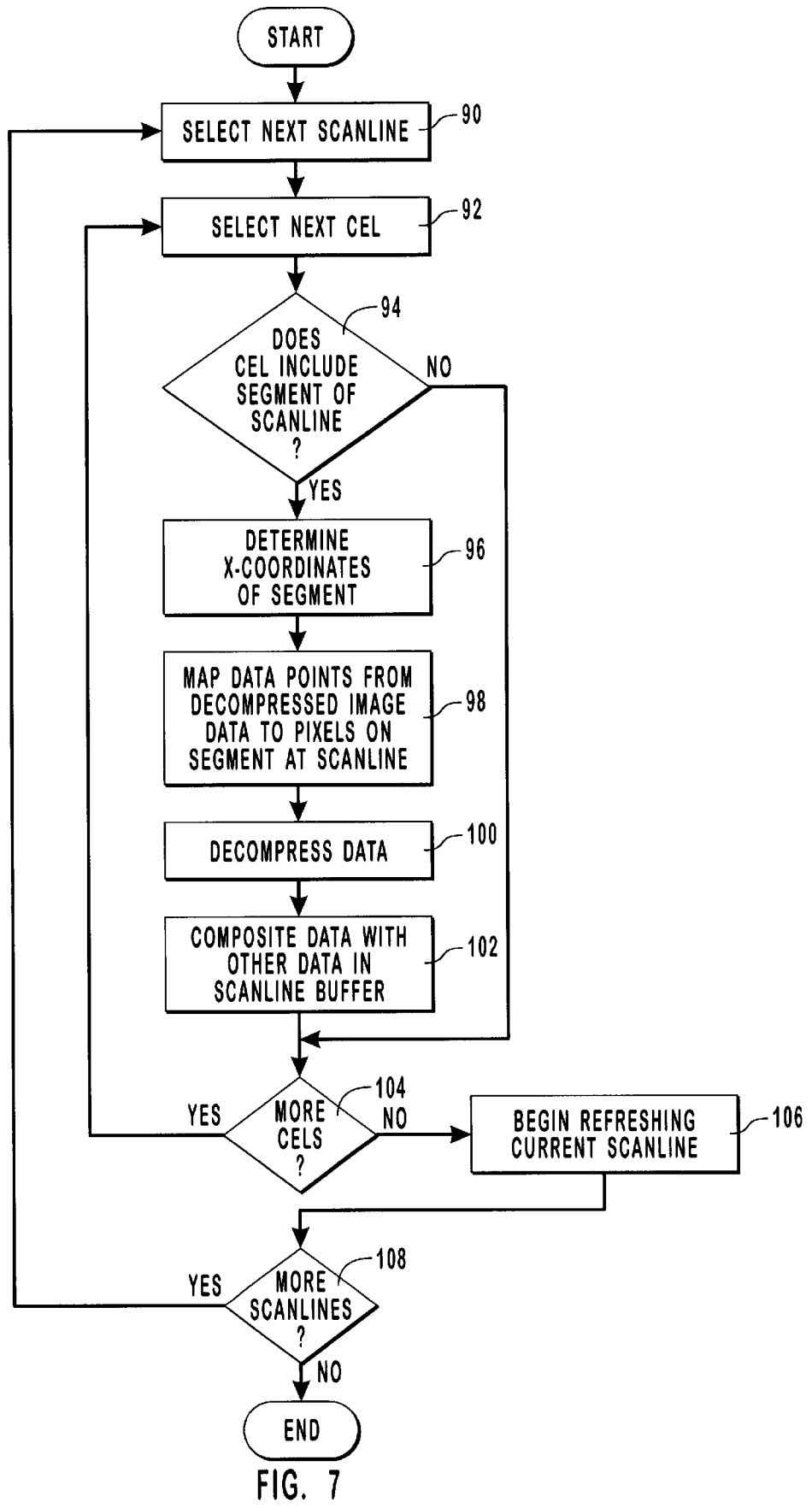
FIG. 7 is a flow diagram illustrating one embodiment of a method for mapping, decompressing, and compositing graphical image data according to the invention.
Figure 8A:
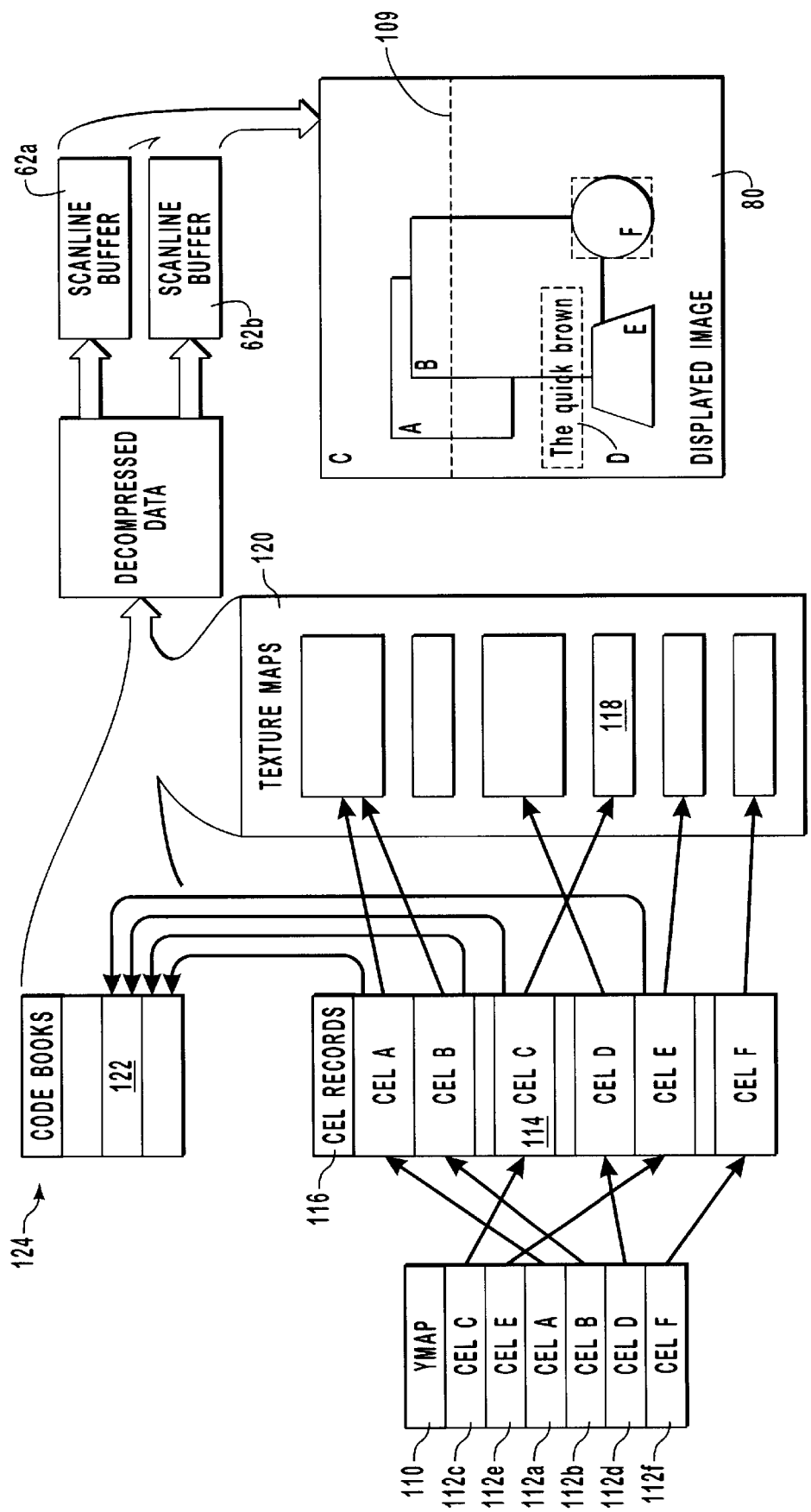
FIG. 8A is a schematic diagram illustrating data structures processed according to the method of FIG. 7.

FIG. 7 is a flow chart depicting steps of one embodiment of the methods of the invention. The method of FIG. 7 performs the steps of mapping the compressed data to appropriate pixels on the display screen, decompressing the data, and compositing the data in scanline buffers 62a and 62b of FIG. 8. The method begins when compressed image data is received at an SGRAM accessible by the graphics engine of the invention. In step 90 of FIG. 7, the next scanline to be refreshed is selected. For purposes of illustration, it is assumed that the next scanline to be refreshed is scanline 109 of FIG. 8A. As shown in FIG. 8A, scanline 109 defines a horizontal line extending across the width of displayed image 80. Cels A, B, and C include all or a segment of scanline 109 as shown in FIG. 8B. Referring to FIG. 7, the next cel record is selected in step 92. In this embodiment, step 92 is conducted by selecting the next cel listed in YMap 110 of FIG. 8A. YMap 110 specifies the y-coordinates of the top and bottom edges of each cel of displayed image 80. By referring to YMap 110, the systems of the invention can determine which cels must be composited for each scanline. In this example, the cels are listed in background-to-foreground order in YMap 110.

According to decision block 94 of FIG. 7, if the selected cel includes a segment of the current scanline, the method proceeds to step 96. In the example in FIG. 8A, cel C, which is the first cel listed in YMap 110, includes a segment of scanline 109. The cel C entry 112c in YMap 110 points to a cel C record 114 in cel records list 116, which, among other properties, defines the x-coordinates of the segment of scanline 109 included in cel C.

Referring to FIG. 7, data from the compressed image data are mapped to the pixels on the segment of the scanline in step 98. As seen in FIG. 8A, cel C record 114 is associated with texture map 118 stored in a texture map repository 120. Cel C record 114 includes information required to map compressed data in texture map 118 to x-coordinate positions along scanline 109.

In FIG. 7, the data points mapped in step 98 are decompressed as illustrated by step 100. Turning to FIG. 8A, cel C record 114 also points to a code book 122 stored in code books repository 124. Decompression in this embodiment is conducted by a vector quanitization decompression algorithm in which the selected data entries of texture map 118 are associated with code book entries in code book 122. The code book entries define pixel colors that are to be displayed on the pixels of the current scanline.

In step 102 of FIG. 7, the data decompressed in step 100 is composited to scanline buffer 62a. Because the data associated with cel C are the first data that have been decompressed for the current scanline 109, the data are simply written to scanline buffer 62a. According to decision block 104, the method then determines whether more cels are to be considered for the current scanline. Since the end of YMap 110 of FIG. 8A has not yet been reached, the method proceeds from decision block 104 of FIG. 7 to step 92. The next cel entry in YMap 110 is cel E entry 112e. Because cel E does not include a segment of current scanline 109, the method proceeds from decision block 94 of FIG. 7 to decision block 104. The end of YMap 110 has not yet been reached, so the method advances again to step 92. Cel A entry 112a of YMap 110 corresponds to cel A, which includes a segment of current scanline 109 as illustrated in FIG. 8B. Accordingly, the method proceeds from decision block 94 to step 96. Steps 96, 98, and 110 are then conducted in substantially the same manner as described above in reference to cel C. In step 102 of FIG. 7, the decompressed data associated with cel A is composited with the data associated with cel C, which has already been written to scanline buffer 62a.

The compositing process may include combining the decompressed image data with other data already written to scanline buffer 62a according to an alpha channel parameter that defines the translucence value of the current cel. For example, cel A may be assigned an alpha value that renders cel A partially transparent. As a result, the decompressed data associated with cel A is combined with the decompressed data associated with cel C according to a relative weight factor proportional to the alpha channel parameter of cel A. Thus, when pixels are lighted on scanline 109, the luminance and chrominance properties of the pixels of the scanline will represent data associated with both cel C and cel A.

Turning to FIG. 7, decision block 104 is answered affirmatively because the end of YMap 110 of FIG. 8A has not yet been reached. Cel B entry 112b of YMap 110 is associated with cel B which includes a segment of current scanline 109. Thus, steps 96, 98, 100, and 102 are conducted in substantially the same way as described above in reference to cels C and A. In this case, cel B may have a translucence value indicating, for example, that cel B is to be fully opaque. In this case, the decompressed data associated with cel B is written over the corresponding portions of the data already stored in scanline buffer 62a.

As illustrated by decision block 104 of FIG. 7, the method proceeds again to step 92, in which cel D entry 112d of YMap 110 is selected. Because cel D does not include a segment of scanline 109, cel entry F 112f is subsequently selected as shown by steps 94, 104, and 92 of FIG. 7. Cel F likewise does not include a segment of scanline 109, and the method advances to decision block 104. At this point, the information needed to refresh scanline 109 has been assembled and composited in scanline buffer 70. Since cel entry F 112f is the last entry in YMap 110, the method moves to step 106, in which the composited data stored in scanline buffer 70 is transmitted to the display screen.

While scanline 109 is being refreshed, the process of mapping, decompressing, and compositing the data associated with the next scanline is conducted. As seen in FIG. 7, the method proceeds from decision block 108 to step 90 to begin processing the data for the next scanline. In this manner, successive scanlines are refreshed to generate the desired image on the display screen.

2. Graphics Engine

Figure 9:
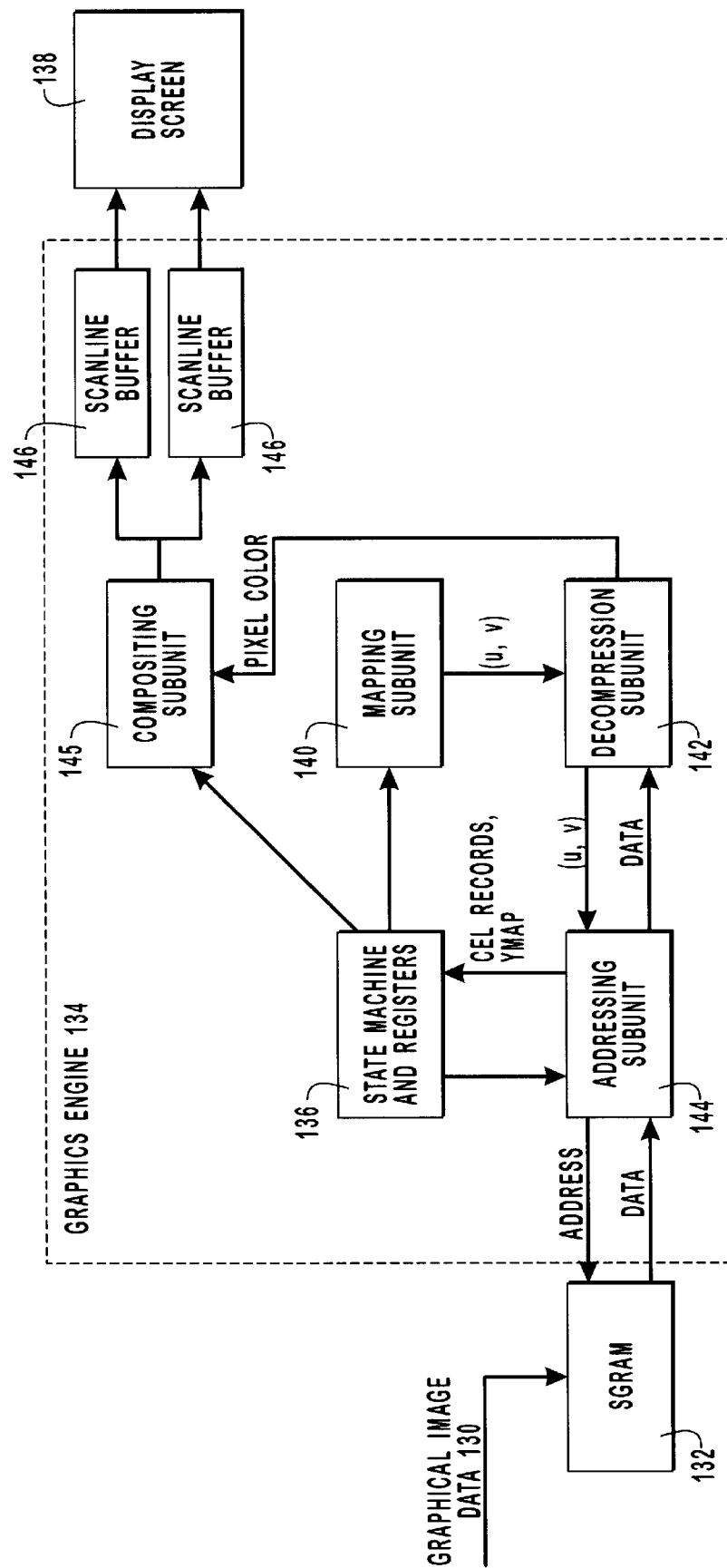
FIG. 9 is a schematic diagram illustrating one embodiment of a graphics engine according to the invention.

FIGS. 9–15 illustrate the features and operation of one embodiment of the systems and methods of the invention that can be implemented in, for example, a WebTV set-top box. FIG. 9 depicts a graphics engine capable of performing the data mapping, decompression, and compositing according to the method of FIG. 7 or other embodiments of the methods of the invention. Graphical image data 130 is stored at SGRAM 132 so that it can be accessed by graphics engine 134. State machine and registers 136 controls the operation of the various other components of graphics engine 134 and makes selected parameters from the cel records and YMap available to the components.

Mapping subunit 140 accesses graphical image data 130, including the cel records, YMap, and texture maps. As further described herein, mapping subunit identifies (u,v) texture map coordinates that correspond to (x,y) pixel coordinates of display screen 138. Decompression subunit 142 receives the (u,v) texture map coordinates that have been mapped to pixel positions and passes the coordinates to an addressing subunit 144. An address for retrieving the portion of the graphical image data 130 is passed from address subunit 144 to SGRAM 132. The specified data is then transmitted from SGRAM 132 to addressing subunit 144, and in turn to decompression subunit 142.

When the retrieved graphical image data is compressed, decompression subunit 142 performs the necessary processing to decompress the data. In one example, the data is compressed according to vector quantization, which is described herein. A preferred graphics engine 134 is also capable of mapping and compositing non-compressed image data. In this case, the decompression step otherwise performed by decompression subunit 142 is skipped. In either case, decompressed or non-compressed graphical image data defining pixel display parameters, including pixel colors, is transferred to compositing subunit 145. The data is then combined with other data that may have already been stored at scanline buffer 146 according to the compositing techniques of the invention.

The following discussion is directed to specific details of the data structures and the mapping, decompression, and compositing operations that are compatible with graphics engine 134 of FIG. 9. The following detailed treatment of these features and functions of this embodiment of the invention is for illustration purposes, and is in no way intended to limit the scope of the appended claims.

3. Cel Data Structures

Figure 10:
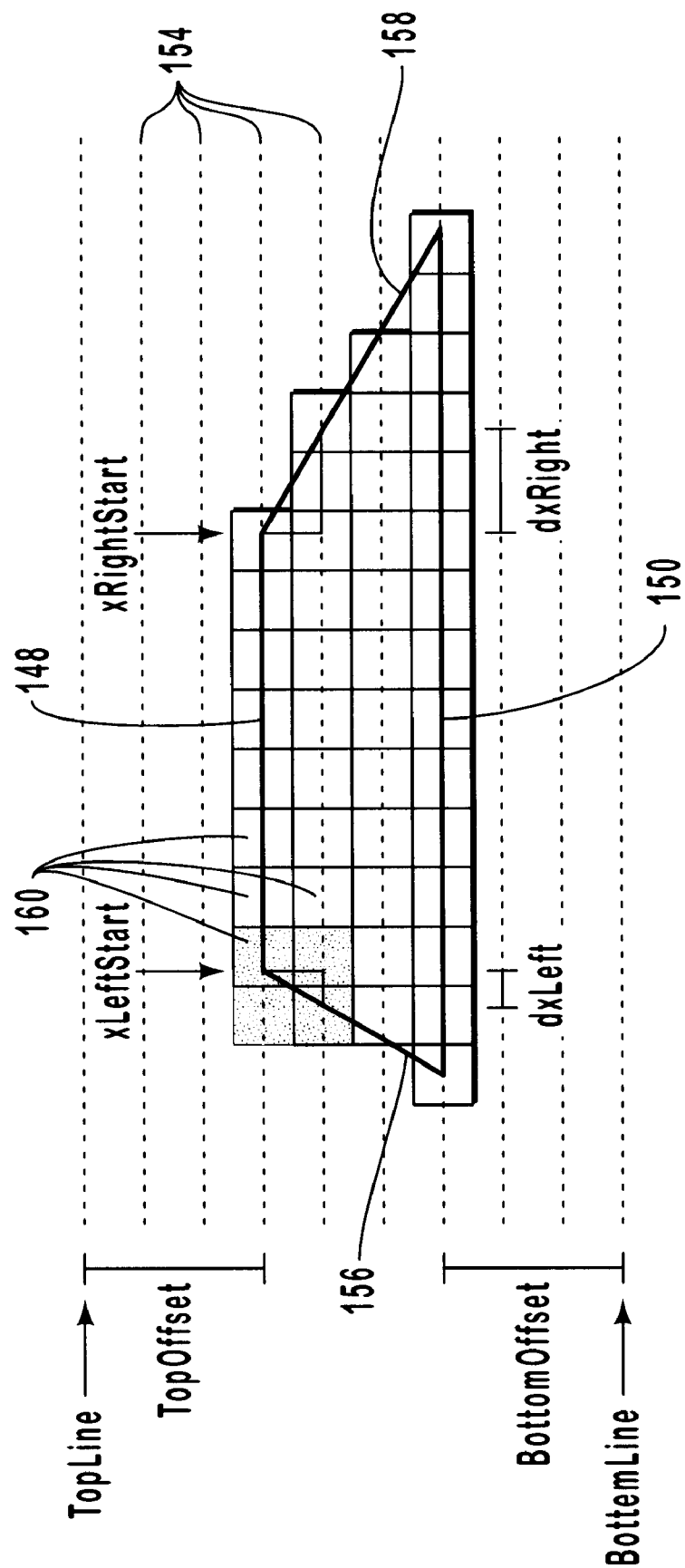
FIG. 10 illustrates a cel and associated cel parameters in relation to scanlines and pixels on a display screen.

According to the embodiment of FIGS. 9–15, the image displayed on the display screen is assembled from a plurality of cels containing component images. The cels of this embodiment, one example of which is illustrated in FIG. 10, are scanline-aligned trapezoids. The top and bottom boundary lines 148 and 150 of cels 152 fall exactly on one of scanlines 154, and the left and right boundary lines 156 and 158 are oriented at any non-horizontal angle. The boundaries, size, orientation, and other properties of the cels can be defined in the cel records described herein. In this embodiment, the cel records include parameters defining the properties of the cels. Before further describing the parameters, it is noted that the cel records associated with related cels can be conveniently organized in celblocks. For example, cel D of FIG. 5 can be defined as including thirteen component cels, each representing one letter of text. The cel records for each of the thirteen component cels can be organized into a celblock to facilitate the retrieval of the cel parameters and the assembly of the associated image in the scanline buffers.

According to this example, illustrated in FIGS. 10 and 11, the length and position of cel boundary lines associated with a cel can be defined by the following parameters:

| | |
|---|---|
| TopLine | Integer reference number of the scanline of the display screen that corresponds to the top line of the celblock containing the particular cel. |
| TopOffset | Integer representing the number of scanlines separating the top boundary line of the cel from the topLine scanline. |
| BottomLine | Integer reference number of the scanline of the display screen that corresponds to the bottom line of the celblock containing the particular cel. |
| TopOffset | Integer representing the number of scanlines separating the bottom boundary line of the cel from the bottomLine scanline. |
| XLeftStart | Fixed-point x position of the upper left-hand corner of the cel. |
| DxLeft | Fixed-point slope, dx/dy, of the left boundary line of the cel. |
| XRightStart | Fixed-point x position of the upper right-hand corner of the cel. |
| DxRight | Fixed-point slope, dx/dy, of the right boundary line of the cel. |

While the top and bottom boundary lines 148 and 150 of a cel fall exactly on a scanline 154, the right and left boundary lines 156 and 158 can have sub-pixel positioning according to this embodiment of the invention. When the graphics engine writes pixels 166 into the scanline buffers, the sub-pixel coordinate values are rounded to the nearest integer pixel position, although sub-pixel positioning can be maintained internally for computational purposes.

4. Forward Texture Mapping

As previously noted, the graphics engine of this embodiment maps, decompresses, and composites graphical image data on a scanline-by-scanline basis. The mapping technique employed by this embodiment is termed "forward texture mapping", in which x (pixel) and y (scanline) coordinates of the cel are used to identify the corresponding u, v, and, optionally, w (perspective), coordinates of the texture map. When, for example, the scanline currently being composited corresponds to the top boundary line of the cel, the graphics engine uses the parameters xLeftStart and xRightStart to determine the pixels to which the texture map data is to be mapped. When subsequent scanlines of the cel are processed, the parameters dxleft and dxRight are used to select a segment of the new scanline to which data from the texture map is to be mapped.

Figure 11B:
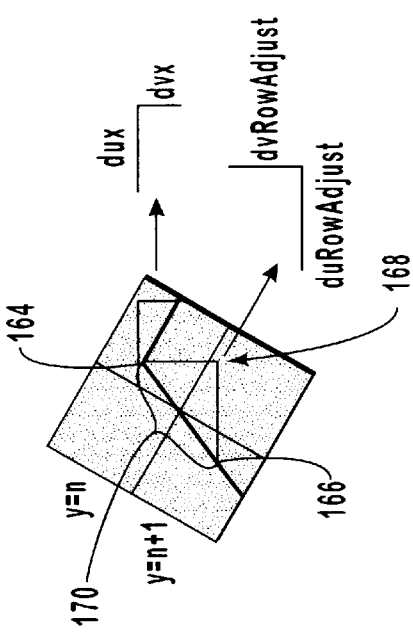
Figure 11A:
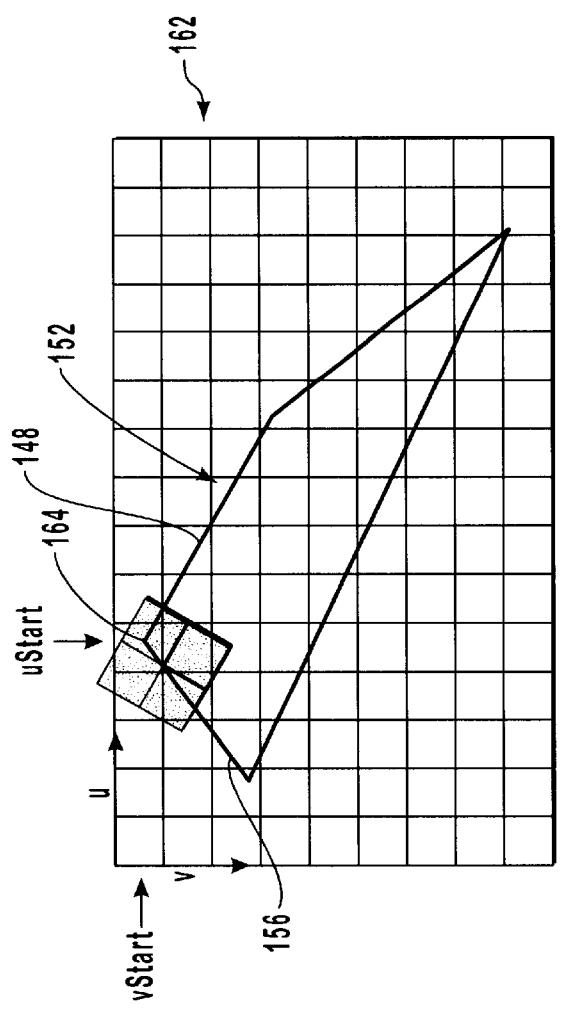
FIG. 11a shows the cel of FIG. 10 applied to a texture map in a mapping step according to an embodiment of the methods of the invention.

FIGS. 11a and 11b illustrate one example of mapping texture map data to a scanline in the cel shown in FIG. 10. In this example, cel 152 is rotated counterclockwise to generate an image in which texture map 162 will be perceived as having been rotated clockwise. UStart and vStart are fixed point values that correspond to the sub-pixel position of the upper left-hand corner 164 of cel 152, and the point (uStart, vStart) corresponds precisely with (xLeftStart, topLine+topOffset). The values of uStart and vStart are written to registers in the graphics engine in preparation for selecting other points in texture map 162 that correspond to the first scanline of the cel. The coordinates uStart and vStart are rounded to the nearest integers to determine the address in memory from which compressed data is to be retrieved in order to be decompressed, composited, and displayed on the pixel location nearest (xLeftStart, topLine+topOffset).

The graphics engine of this embodiment continues identifying addresses in the memory that correspond to pixel locations of the scanline of the cel by incrementing (xLeftStart, topLine+topOffset) in the x direction. When a first scanline has been composited and displayed, the graphics engine proceeds to the next scanline. Moving from one scanline to the next requires an increment in the y coordinate. When the display screen uses the interlaced video format, the y coordinate is incremented by a value of two. Moreover, because cels are trapezoids that may be rotated with respect to the data in the texture maps as shown in FIG. 11a and the left boundary line 156 of the cel may not be at a right angle with top boundary line 148, there is often a change in the y coordinates defining the cel as the graphics engine moves between scanlines. Thus, for each increment in y, there must be a "row adjustment" to u and v to find the starting point in the mapping procedure for each successive scanline.

The parameters used to compute the row adjustment, or the (x,y) coordinates at the left endpoint 166 of the segment of successive scanlines are described in reference to FIGS. 11a and 11b. The parameters, whose values can be specified in the cel records, are defined as follows:

| | |
|---|---|
| Dux | The change in the u-direction across one pixel width in the x-direction. |
| Dvx | The change in the v-direction across one pixel width in the x-direction. |
| DuRow-Adjust | The change in the u-direction from the left endpoint of the top scanline to the left endpoint in the next scanline in the cel. |
| DvRow-Adjust | The change in the v-direction from the left endpoint of the top scanline to the left endpoint in the next scanline in the cel. |

It is noted that duRowAdjust and dvRowAdjust are sides of a right triangle 168 having as the hypotenuse 170 the segment of the left boundary line 156 between the top scanline and the next scanline as shown in FIG. 11b.

The graphics engine of this embodiment can create the perception of depth or perspective by using a homogenous coordinate, w, as it maps data to pixel positions on scanlines. The w-direction is a third direction orthogonal to u and v and defines the degree of foreshortening of the displayed image in the z-direction. In this embodiment, the degree of foreshortening is proportional to 1/w, such that as w increases, the associated image is perceived as being positioned at a greater depth in the displayed image. When the coordinate w is used, the parameters wStart, dwx, and dwRowAdjust are defined or computed analogously to the u and v parameters described above.

5. Vector Quantization

Figure 12A:
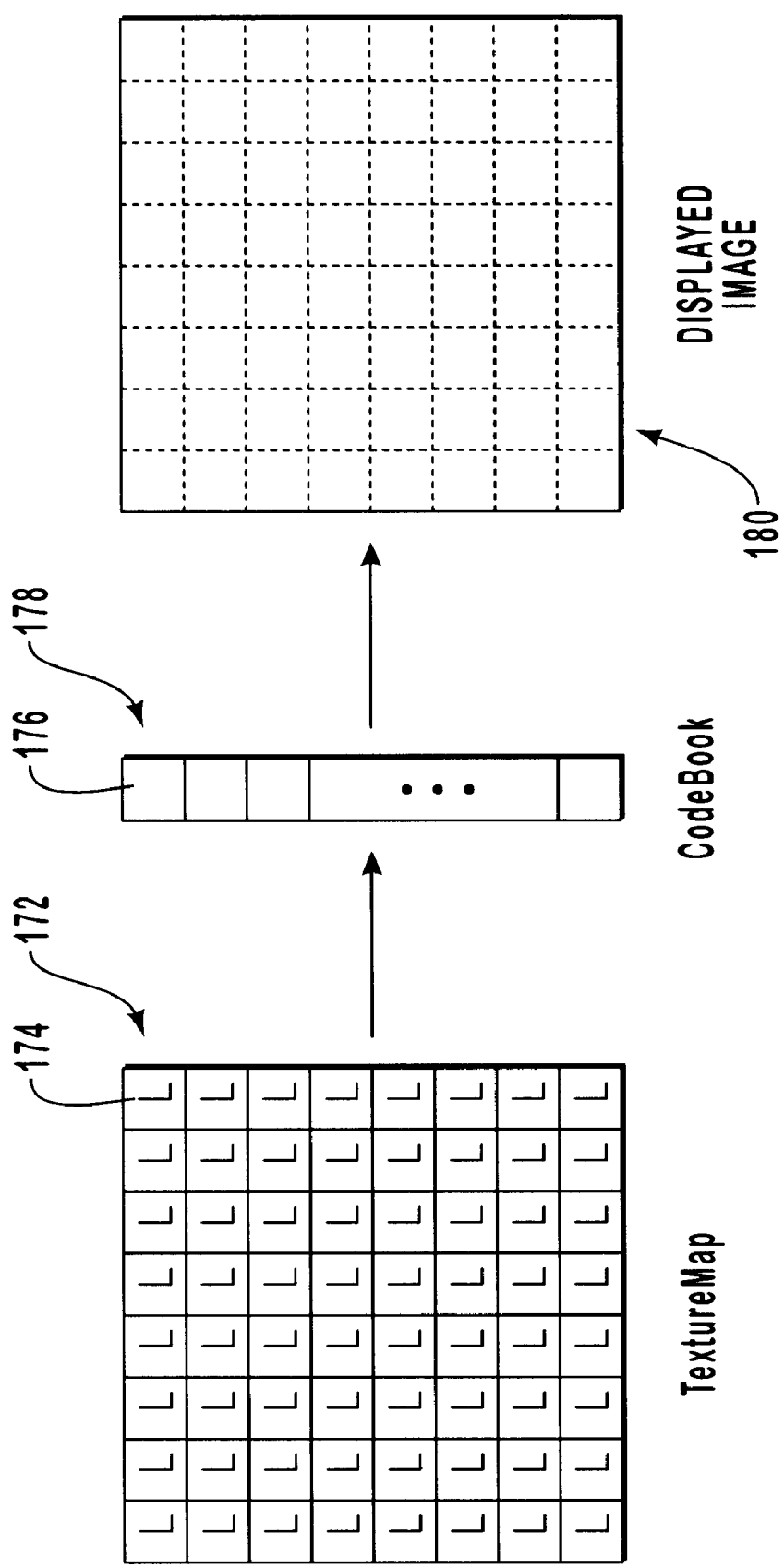
FIG. 12a is a schematic diagram illustrating a vector quantization decompression technique in which vectors in the texture map and entries in the codebook correspond to 1×1 pixel blocks.

Vector quantization is a lossy data compression method whereby an image is defined by "vector" data structures, which are, for example, 8 bit numbers. Each vector points to an entry in a decompression codebook, or a color lookup table ("CLUT"), which defines the colors to be displayed on pixels of the display screen. When the vectors consist of 8 bits, the CLUT can have up to 256 entries, each of which can define a different color. FIG. 12a illustrates an example of vector quantization decompression, in which texture map 172 includes vectors 174, each of which points to one of the entries 176 in codebook 178.

In order to generate an image that has a desired appearance with minimal loss of quality, the colors defined in the CLUT should be carefully selected. If for example, the compressed image represents a sunset scene, the colors defined in the CLUT can advantageously include a disproportionate number of entries defining reds and oranges.

The data compression ratio associated with 8-bit vectors and a CLUT having 256 entries, compared to "true color" data in which each pixel is defined by a 24-bit number, is about 3:1. The compression ratio can be increased by a technique whereby each vector corresponds to more than one pixel and each entry corresponds to a block of colors. For example, each vector in the compressed data may represent a 2×2 block of pixels as shown in FIG. 12b, in contrast to the 1×1 blocks of pixels in FIG. 12a.

Figure 12B:
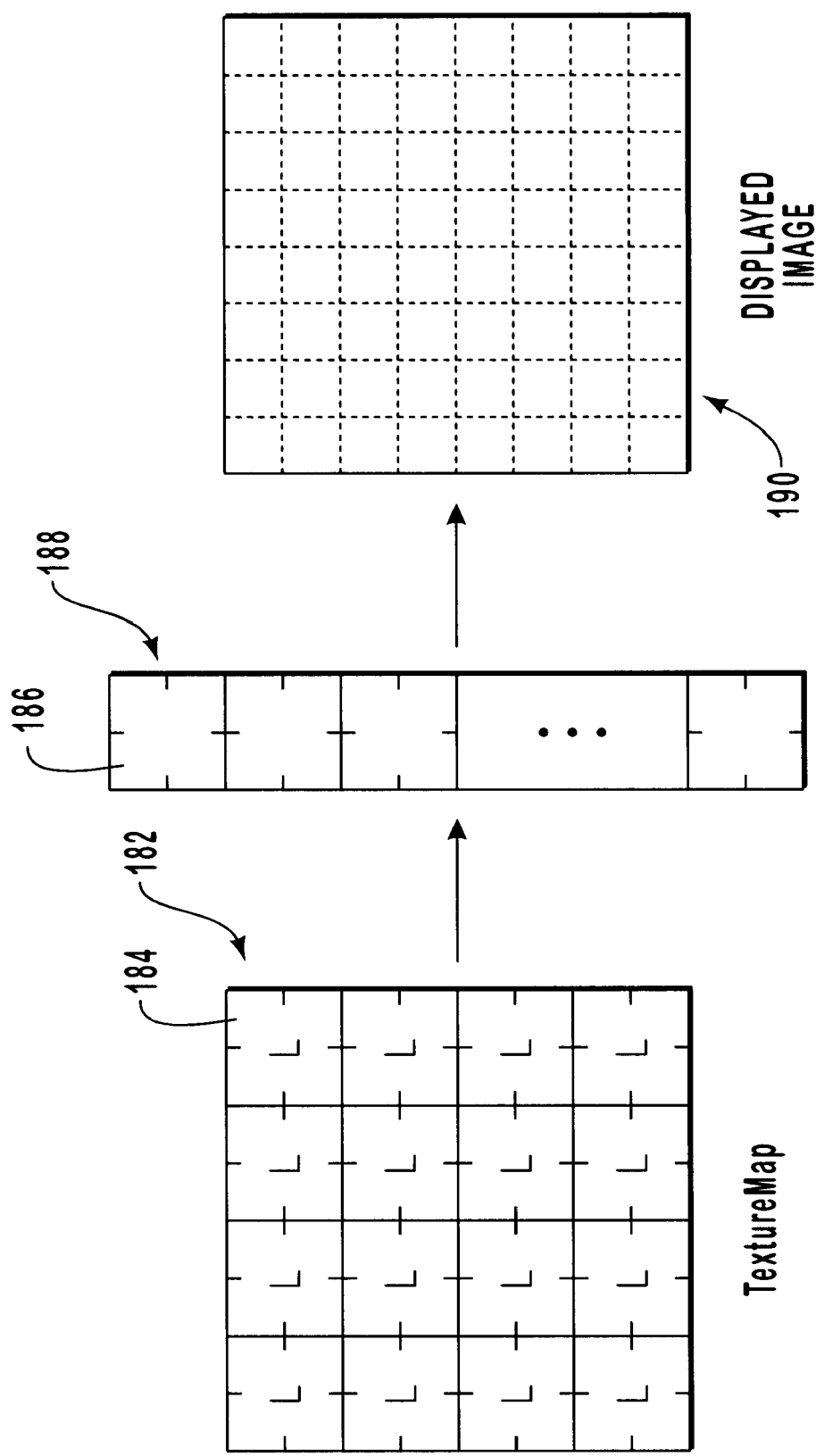
FIG. 12b is a schematic diagram illustrating a vector quantization decompression technique in which vectors in the texture map and entries in the codebook correspond to 2×2 pixel blocks.

In FIG. 12b, each vector 182 in texture map 186 corresponds to a 2×2 block of pixels on the display screen. Each entry 186 in CLUT 188 defines a 2×2 block of colors that are to be applied to the 2×2 block of pixels associated with vectors 184. A vector quantization compression technique using 2×2 blocks increases the compression ratio from 3:1 to 12:1. However, it is typically somewhat more difficult to select the 256 entries, each representing a 2×2 block of colors than it is to select the entries in a 1×1 CLUT. The embodiment of the invention illustrated in FIGS. 9–15 can be compatible with vector quantization using 1×1 blocks, 1×2 blocks, and 2×2 blocks. Other embodiments, of course, can use vector quantization having other color block sizes.

It is also possible to have multiple codebooks, or CLUTs. In particular, each cel record that is associated with image data compressed using vector quantization can point to one of any number of CLUTs. Accordingly, each texture map can be decompressed using a CLUT having colors selected to generate an image of optimal quality. According to this embodiment, the graphics engine can also have a default CLUT that is used unless another CLUT is specified in the cel record.

The present embodiment of the invention is also compatible with non-compressed image data. In this case, the non-compressed data can simply include numbers specifying the luminance, chrominace, and optionally, translucence values to be assigned to pixels on the display screen.

6. Pixel Display Parameters

In the embodiment illustrates in FIGS. 9–15, at least two pixel specification formats can be supported. As an initial matter, the image data can be represented in the YCrCb format (sometimes called "YUV" format), which is the native format of video using the National TV Standards Committee ("NTSC"; used in the United States) or Phase Alternating Line ("PAL"; used in much of Europe) display standards and the Joint Photographic Experts Group ("JPEG") or Moving Pictures Experts Group ("MPEG") compression standards. Other embodiments of the invention can support the RGB format, which is the native format of Macintosh, PC, and workstations.

In the YCrCb format, Y represents the luminance or perceptual brightness of the pixel, while Cr and Cb represent the chrominance or color characteristics of the pixel. In addition to Y, Cr, and Cb, an alpha channel component, A, can be included in the image data. A is a fractional parameter that defines the transparency or opacity of an image with respect to background images.

The embodiment of FIGS. 9–15 can be configured to support the following two pixel specification formats:

4:4:4 YCbACr; 32 bits/pixel

4:2:2 YCbYCr; 16 bits/pixel

The numbers in the ratios indicate the relative amount of data defining Y, Cb, and Cr, respectively.

Figure 13A:
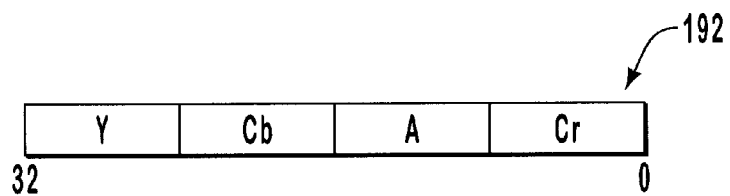
FIG. 13a illustrates a data structure defining pixel display parameters using a 4:4:4 YCbCr format.
Figure 13B:
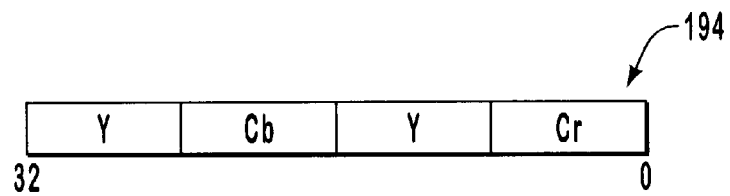
FIG. 13b illustrates a data structure defining pixel display parameters using a 4:2:2 YCbCr format.

FIGS. 13c and 13b depict 32-bit numbers that specify pixel display parameters according to the 4:4:4 and 4:2:2 formats, respectively. In FIG. 13c, each 32-bit number 192 represents the display parameters for one pixel. When vector quantization decompression is used, numbers 192 can constitute the entries in the CLUT. Thus, each vector in the compressed image data points to one or more numbers 192 that specify the display parameters of the associated pixels on the display screen. When non-compressed image data is used, number 192 can constitute the image data, itself In FIG. 13b, each 32-bit number 194 represents the display parameters of two adjacent pixels. The two pixels share common Cr and Cb values, and each pixel has its own Y value. It has been found that the 4:2:2 format, in which the resolution of the Cr and Cb values is reduced, can produce images with minimal loss of quality compared to the 4:4:4 format in many instances. It is noted that the 4:2:2 does not include a per-pixel A value. Instead, the cel record of the cel to which the data is mapped can specify a global A value defining the transparency or opacity of the entire cel. It is also noted that the 4:2:2 format requires only half the memory resources as the 4:4:4 format.

7. Compositing Procedures

Figure 14A:
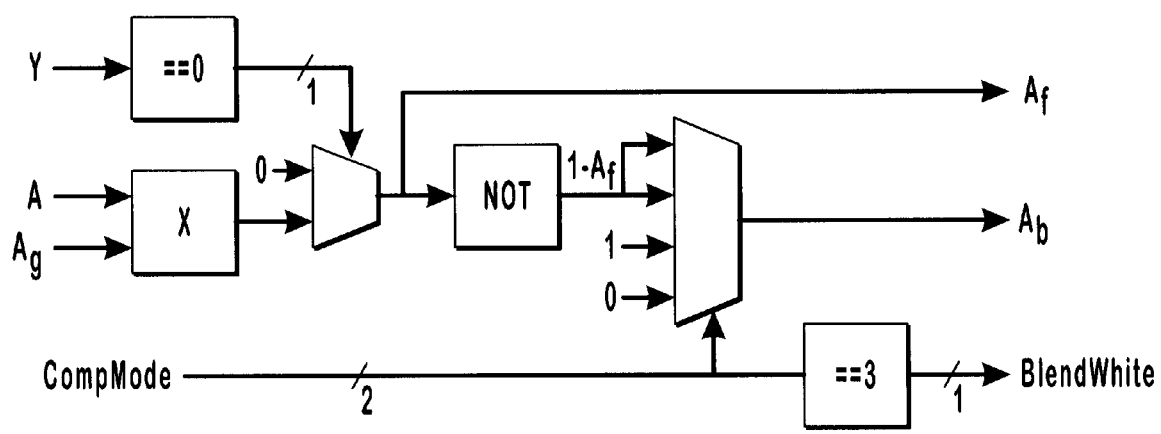
FIG. 14a is a block diagram depicting the calculation of the value of translucence parameters to be applied to data composited to a scanline buffer.

Once image data has been mapped to pixel locations and decompressed, the data is composited into one of the scanline buffers using the value of the translucence parameter. In other words, decompressed data is combined with other data already stored in the scanline buffer based on the value of the translucence parameter assigned to the data. FIG. 14a depicts one embodiment of a system according to the invention for determining an $A_f$ value, which is the translucence value to be applied to the pixel being written to the buffer (foreground image), and an $A_b$ value, which is the translucence value to be applied to the data previously stored in the buffer (background image). The inputs to the system of FIG. 14a include the luminance value Y of the pixel being written to the scanline buffer, the translucence value A assigned, on a per-pixel basis, to the pixel being written to the scanline buffer, and a global translucence value $A_g$ applied to all pixels of the cel that includes the pixel being written. The A value can be defined to default to 256 (opaque) when the 4:2:2 pixel format is used. All buses of FIGS. 14a and 14b are 8 bits wide unless otherwise specified.

Another input, CompMode, is a parameter defined in the cel record that determines how the background translucence value, $A_b$, is to be calculated given the values of A and $A_g$. $A_b$ is selected to be either 0, 1, (1−$A_f$), or (1−$A_f$) when CompMode==0, 1, 2, or 3, respectively. Moreover, when CompMode==3, the background color is forced to white (BlendWhite). It is also noted that $A_f$ is the product of A and $A_g$. If Y==0, $A_f$ is forced to 0 (transparent).

Figure 14B:
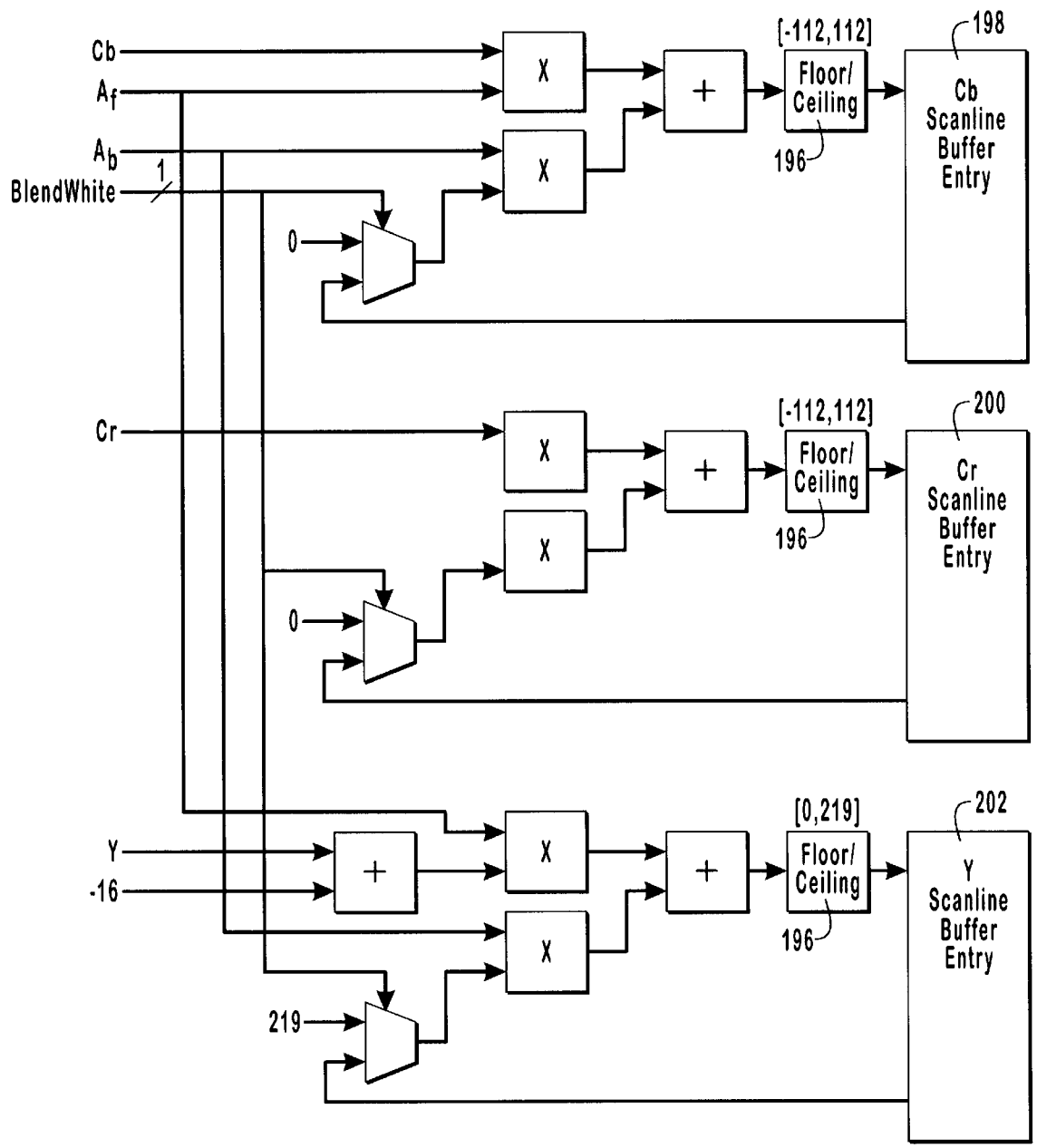

FIG. 14b illustrates one embodiment of a system according to the invention for compositing the data once $A_f$ and $A_b$ have been calculated. The inputs Y, Cr, and Cb, are the color components of the pixel data being written to the scanline buffer. In this example, Y initially has a range of [16, 235]. The input "−16" is a normalization value, which normalizes the Y value to the range [0, 219]. Of course, depending on the specific implementation, of the system of FIG. 14b, there may be no need to normalize Y, or the normalization value may be different. In this example, Y is stored in the scanline buffer with its normalized value. When it is scanned out of the scanline buffer to a video encoder it is increased by its normalization value. The Floor/Ceiling blocks 196 limits the range of data written to scanline buffer to a desired range. It is noted that when BlendWhite is true, the background pixel is forced to white.

The resulting pixel display parameter values are written to the appropriate portion of the scanline buffer. In particular, the Cb value is written as a Cb scanline buffer entry 198, the Cr value is written as a Cr scanline buffer entry 200, and the Y value is written as a Y scanline buffer entry.

8. Antialiasing

Figure 15:
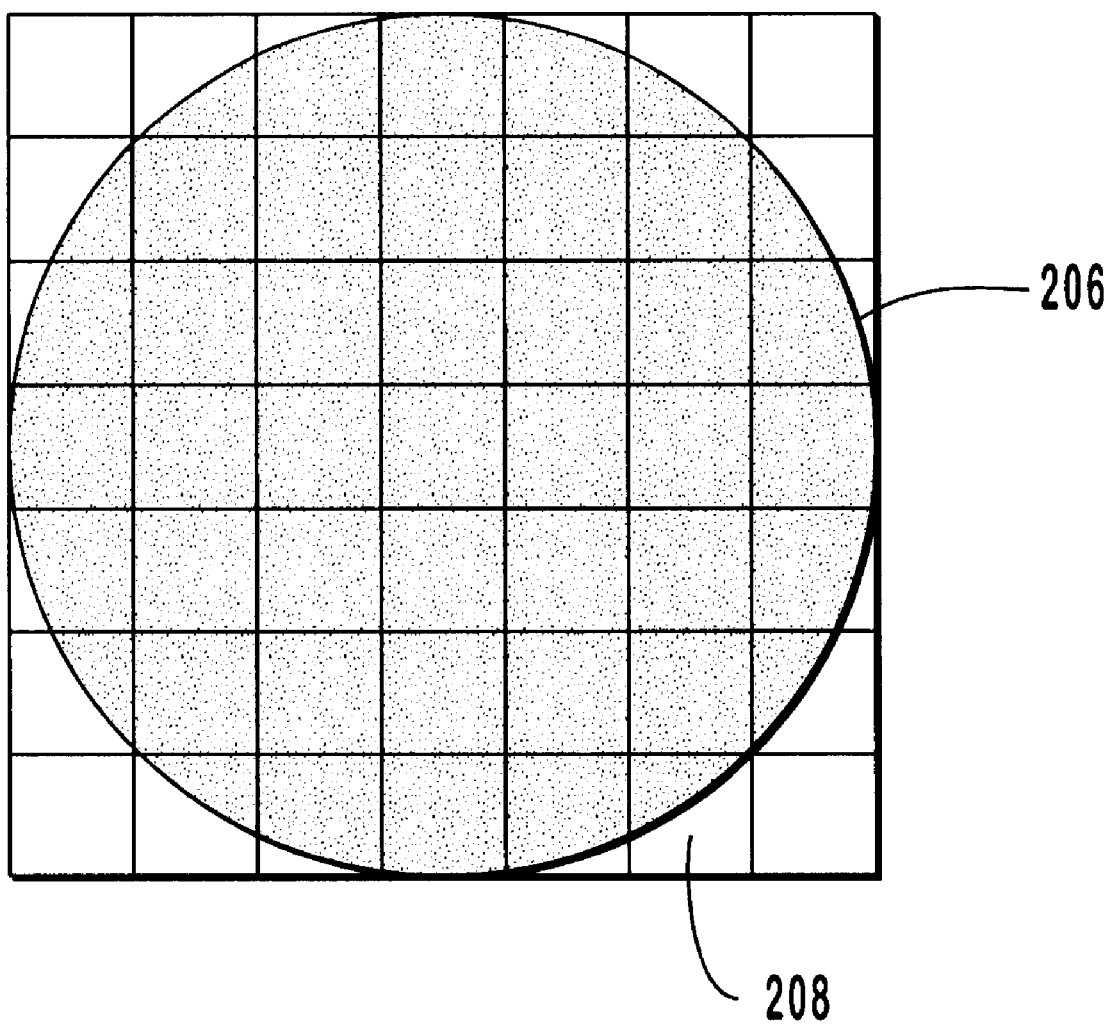
FIG. 15 shows an example of an image to which anti-aliasing techniques are applied.

The graphics engine of FIGS. 9–15 can perform antialiasing of text and other images by including a per-pixel A value in the image data. In this example, the 4:4:4 pixel format includes an A value for each pixel. Antialiasing in this context involves softening the edges of images to that the images appear to have smooth boundaries instead of being composed of discrete pixels. FIG. 15 illustrates one example of antialiasing, wherein the pixels that include the circumference of circle 202 have a values selected to give the circle a smooth, round appearance. For example, just under one-half of pixel 206 lies inside the circumference of circle 204. Accordingly, pixel 206 may be assigned an A value that defines a translucence of slightly more than 50% for the pixel. Other pixels that include portions of the circumference are assigned appropriate A values. Such antialiasing can improve the readability and text and the general appearance of other images.

The present invention may be embodied in other specific forms without departing from its spirit or other essential characteristics. The described embodiments are to be considered in all respects only as illustrative and not restrictive. The scope of the invention is, therefore, indicated by the appended claims rather than by the foregoing description. All changes which come within the range of equivalency of the claims are to be embraced within their scope.

What is claimed and desired to be secured by United States Letters Patent is:

1. In a system that includes a graphics engine for rendering images on a display screen, a method for processing compressed graphical image data received by the graphics engine in preparation for rendering an image represented by the graphical image data, wherein less than all of the compressed graphical image data received by the graphics engine is decompressed, comprising the steps of:

receiving compressed graphical image data and information specifying a boundary encompassing graphical image data that is to be rendered on the display screen, wherein a first portion of the compressed graphical image data is positioned within the boundary and is to be rendered on a scanline of the display screen and wherein a second portion of the compressed graphical image data is positioned outside the boundary and is not to be rendered on the display screen;

mapping the first portion of the compressed graphical image data to pixels of a scanline of the display screen prior to the first portion of the compressed graphical image data being decompressed;

decompressing the first portion of the compressed graphical image data that has been mapped to the pixels of the scanline so as to identify display parameters to be assigned to the pixels and translucence parameters specifying a relative weight to be given to the display parameters with respect to any data previously stored at a scanline buffer associated with the scanline;

compositing the display parameters to the scanline buffer using the translucence parameters; and transmitting the composited display parameters to the display screen to refresh the scanline as part of an operation of refreshing the display screen, wherein the display screen is refreshed without the second portion of the compressed graphical image data being decompressed.

2. A method as defined in claim 1, wherein the scanline buffer is capable of storing, at any one time, display parameters to be assigned to the pixels of no more than a single scanline.

3. A method as defined in claim 1, wherein the step of mapping the first portion of the compressed graphical image data comprises the step of identifying a segment of the scanline of the display screen on which the first portion of the compressed graphical image data is to be displayed.

4. A method as defined in claim 1, wherein the step of mapping the first portion of the compressed graphical image data comprises the step of identifying addresses associated with a memory device, the addresses being assigned to the first portion of the compressed graphical image data.

5. A method as defined in claim 4, wherein the step of decompressing the first portion of the compressed graphical image data comprises the step of retrieving the first portion of the compressed graphical image data from the memory device using the addresses.

6. A method as defined in claim 1, wherein the step of decompressing the first portion of the compressed graphical image comprises the step of performing vector quantization decompression on the first portion of the compressed graphical image data.

7. A method as defined in claim 6, wherein the first portion of the compressed graphical image data includes vector data structures, the step of performing vector quantization comprising the steps of:
   reading one of the vector data structures; and
   identifying an entry in a decompression codebook, the entry being referenced by said one of the vector data structures, the entry specifying the display parameters.

8. A method as defined in claim 1, wherein the step of compositing the display parameters comprises the step of combining the display parameters and other data already stored at the scanline buffer.

9. A method as defined in claim 8, wherein the step of combining the display parameters with the other data is conducted by combining the display parameters and the other data using a translucence parameter associated with the display parameters, the translucence parameter specifying a relative weight to be given to the display parameters with respect to the other data as the display parameters and the other data are combined.

10. A method as defined in claim 1, wherein:
   the graphical image data resides in an image data coordinate system having a u axis and a v axis;
   the boundary is trapezoidal and defines a pixel coordinate system having an x axis and a y axis that are not parallel with the u axis and the v axis, respectively; and
   the step of mapping the first portion of the compressed graphical image data to pixels of a scanline comprises the step of mapping compressed graphical image data defined in the image data coordinate system to pixel coordinates of the pixel coordinate system.

11. A method as defined in claim 1, wherein the pixel coordinate system defined by the boundary is selected such that the first portion of the compressed graphical image data, when rendered by the graphics engine after the step of mapping, provides a perception of perspective.

12. In system including a display screen and a processor capable of transmitting signals to the display screen so as to display an image on the display screen, a method for processing graphical image data, comprising the steps of:
   accessing, by a processor, compressed graphical image data structures;
   accessing, by the processor, cel data structures, each being associated with one of the compressed graphical image data structures and defining a region of the display screen on which said one of the compressed graphical image data structures is to be represented;
   determining which of the cel data structures define a region of the display screen that includes at least a segment of a selected scanline of the display screen;
   for each of the cel data structures that define a region of the display screen that includes at least a segment of the selected scanline, repeating the steps of:
      mapping a portion of the associated compressed graphical image data structure to pixels of the segment of the selected scanline;
      decompressing the mapped portion so as to identify display parameters to be assigned to the pixels; and
      compositing the display parameters to a scanline buffer associated with the selected scanline; and transmitting the composited display parameters to the display screen.

13. A method as defined in claim 12, further comprising, when the step of transmitting the composited display parameters to the display screen has been initiated, the step of compositing, to a second scanline buffer associated with a second scanline, second display parameters to be assigned to pixels of the second scanline.

14. A computer program product for implementing, in a system that includes a graphics engine for rendering images on a display screen, a method for processing compressed graphical image data received by the graphics engine in preparation for rendering an image represented by the graphical image data, wherein less than all of the compressed graphical image data received by the graphics engine is decompressed, the computer program product comprising:
   a computer-readable medium having computer-executable instructions for performing the steps of:
      receiving compressed graphical image data and information specifying a boundary encompassing graphical image data that is to be rendered on the display screen, wherein a first portion of the compressed graphical image data is positioned within the boundary and is to be rendered on a scanline of the display screen and wherein a second portion of the compressed graphical image data is positioned outside the boundary and is not to be rendered on the display screen;
      mapping the first portion of the compressed graphical image data to pixels of a scanline of the display screen prior to the first portion of the compressed graphical image data being decompressed;
      decompressing the first portion of the compressed graphical image data that has been mapped to the pixels of the scanline so as to identify display parameters to be assigned to the pixels and translucence parameters specifying a relative weight to be given to the display parameters with respect to any data previously stored at a scanline buffer associated with the scanline;
      compositing the display parameters to the scanline buffer using the translucence parameters; and
      transmitting the composited display parameters to the display screen to refresh the scanline as part of an operation of refreshing the display screen, wherein the display screen is refreshed without the second portion of the compressed graphical image data being decompressed.

15. A computer program product as defined in claim 21, wherein the step of decompressing the first portion of the compressed graphical image data comprises the step of identifying display parameters including Y, Cr, and Cb values to be assigned to the pixels.

16. A computer program product as defined in claim 14, wherein the computer-readable medium further has computer-executable instructions for performing the step of establishing communication with a remote server, wherein the compressed graphical image data is received from the remote server.

17. A computer program product as defined in claim 14, wherein the step of establishing communication with the remote server comprises the step of accessing the Internet.

18. A computer program product as defined in claim 14, wherein the computer-readable medium further has computer-executable instructions for performing the steps of:

reading one of a plurality of vector data structures included in the compressed graphical image data; and identifying an entry in a decompression codebook, the entry being referenced by said one of the plurality of vector data structures, the entry specifying the display parameters.

19. In a processor capable of transmitting signals to a display screen so as to generate an image on the display screen, the processor having two scanline buffers each capable of storing display parameters to be used to refresh one scanline of the display screen, a method for decompressing and compositing graphical image data comprising the steps of:

receiving compressed graphical image data and receiving cel data structures, each cel data structure being associated with a subset of the compressed graphical image data and defining a region of the display screen on which the associated subset is to be rendered;

determining which of the cel data structures define a region of the display screen that includes a segment of the first scanline;

using the cel data structures that define said region of the display screen that includes the segment of the first scanline, mapping a first portion of the compressed graphical image data to pixels on the first scanline of the display screen;

decompressing the first portion of the compressed graphical image data so as to identify first display parameters to be assigned to the pixels on the first scanline;

compositing the first display parameters to a first scanline buffer;

transmitting the composited first display parameters to the display screen;

mapping a second portion of the compressed graphical image data to pixels on a second scanline of the display screen;

decompressing the second portion of the compressed graphical image data so as to identify first display parameters to be assigned to the pixels on the second scanline;

compositing the second display parameters to a second scanline buffer; and transmitting the composited second display parameters to the display screen.

20. A computer program product for implementing a method of decompressing and compositing graphical image data, wherein the method is implemented in a processor capable of transmitting signals to a display screen so as to generate an image on the display screen, the computer program product comprising:

a computer-readable medium having computer-executable instructions for performing the steps of:

receiving compressed graphical image data;

mapping a portion of the compressed graphical image data to pixels on a scanline of the display screen;

decompressing the portion of the compressed graphical image data so as to identify display parameters to be assigned to the pixels, the display parameters including:

color values to be assigned to the pixels; and a translucence parameter, the value of which specifies a relative weight to be given to the display parameters with respect to other data previously stored at a scanline buffer;

compositing the display parameters to a scanline buffer, by combining the display parameters with other data previously stored at the scanline buffer according to the relative weight given to the display parameters with respect to said other data as specified by the translucence parameter; and initiating transmission of the display parameters to the display screen.

21. A computer program product as defined in claim 20, wherein the color values include Y, Cr, and Cb values to be assigned to the pixels.

22. In a processor capable of generating an image on the display screen, a method for decompressing and compositing image data comprising the steps of:

receiving compressed image data and cel data structures, wherein each cel data structure is associated with a subset of the compressed image data and defines a region of the display screen on which the associated subset is to be rendered;

mapping a portion of the compressed image data to pixels of a scanline of the display screen prior to the portion of the compressed image data being decompressed, wherein the mapping includes determining which of the cel data structures define a region of the display screen that includes a segment of the scanline;

decompressing the portion of the compressed image data that has been mapped to the pixels of the scanline so as to identify display parameters to be assigned to the pixels; and compositing the display parameters to a scanline buffer that is to be used to refresh the scanline.

23. A method as defined in claim 22, wherein only portions of the compressed image data that are mapped to scanlines of the display screen are decompressed.

24. A method as defined in claim 22, further comprising the steps of:

mapping a second portion of the compressed image data to pixels of a second scanline of the display screen prior to the second portion of the compressed image data being decompressed, wherein the mapping includes determining which of the cel data structures define a region of the display screen that includes a segment of the second scanline;

decompressing the second portion of the compressed image data that has been mapped to the pixels of the second scanline so as to identify display parameters to be assigned to the pixels of the second scanline; and compositing the display parameters to a second scanline buffer that is to be used to refresh the second scanline.

25. A method as defined in claim 22, wherein the step of mapping the portion of the compressed image data comprises the step of identifying addresses associated with a memory device, the addresses being assigned to the portion of the compressed image data.

26. In a processor capable of generating an image on the display screen, a method for decompressing and compositing image data comprising the steps of:

receiving compressed image data;

mapping a portion of the compressed image data to pixels of a scanline of the display screen prior to the portion of the compressed image data being decompressed;

decompressing the portion of the compressed image data that has been mapped to the pixels of the scanline so as to identify display parameters to be assigned to the pixels and translucence parameters specifying a relative weight to be given to the display parameters with respect to any data previously stored at a scanline buffer that is to be used to refresh the scanline; and compositing the display parameters to the scanline buffer using the translucence parameters.

27. A method as defined in claim 26, further comprising the step of receiving information specifying a boundary encompassing image data that is to be rendered on the display screen, wherein a first portion of the compressed image data is positioned within the boundary and is to be rendered on a scanline of the display screen and wherein a second portion of the compressed image data is positioned outside the boundary and is not to be rendered on the display screen.

28. A method as defined in claim 27, further comprising refreshing the display screen using the composited display parameters, wherein the display screen is refreshed without the second portion of the compressed image data having been decompressed.

29. A method as defined in claim 26, further comprising the step of receiving cel data structures, each being associated with a subset of the compressed image data and defining a region of the display screen on which the associated subset is to be rendered.

30. A method as defined in claim 29, wherein the step of mapping comprises the step of determining which of the cel data structures define a region of the display screen that includes a segment of the scanline.

* * * * *

UNITED STATES PATENT AND TRADEMARK OFFICE
CERTIFICATE OF CORRECTION

PATENT NO. : 6,424,342 B1
DATED : July 23, 2002
INVENTOR(S) : Stephen G. Perlman and Beth Clough It is certified that error appears in the above-identified patent and that said Letters Patent is hereby corrected as shown below:

Title page,
Item [56], U.S. PATENT DOCUMENTS, insert
-- 5,005,011    4/1991 Perlman, et al. 340/728 --

Column 5,
Line 18, after "can" insert -- be --

Column 9,
Line 31, change "Mappings" to -- Mapping, --

Column 12,
Line 29, change "Iine" to -- line --

Column 14,
Line 41, change "illustrates" to -- illustrated --

Column 16,
Line 9, replace "to" with -- so --
Line 13, delete "a"

Column 17,
Line 62, after "In" insert -- a --

Signed and Sealed this

Twelfth Day of August, 2003

JAMES E. ROGAN
*Director of the United States Patent and Trademark Office*